US010694489B2

(12) United States Patent
Johansson et al.

(10) Patent No.: US 10,694,489 B2
(45) Date of Patent: Jun. 23, 2020

(54) NETWORK NODES AND METHODS THEREIN FOR MULTILATERATION

(71) Applicant: Telefonaktiebolaget LM Ericsson (publ), Stockholm (SE)

(72) Inventors: Nicklas Johansson, Brokind (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/335,912

(22) PCT Filed: Nov. 3, 2017

(86) PCT No.: PCT/SE2017/051095
§ 371 (c)(1),
(2) Date: Mar. 22, 2019

(87) PCT Pub. No.: WO2018/084794
PCT Pub. Date: May 11, 2018

(65) Prior Publication Data
US 2019/0268872 A1    Aug. 29, 2019

Related U.S. Application Data

(60) Provisional application No. 62/417,354, filed on Nov. 4, 2016.

(51) Int. Cl.
*H04M 11/04* (2006.01)
*H04W 24/00* (2009.01)
(Continued)

(52) U.S. Cl.
CPC ......... *H04W 64/003* (2013.01); *G01S 5/0081* (2013.01); *G01S 5/06* (2013.01);
(Continued)

(58) Field of Classification Search
None
See application file for complete search history.

(56) References Cited

U.S. PATENT DOCUMENTS

| 2002/0065086 A1* | 5/2002 | Vanttinen | H04W 8/08 |
|---|---|---|---|
| | | | 455/456.1 |
| 2003/0119524 A1* | 6/2003 | Carlsson | H04W 64/00 |
| | | | 455/456.1 |

FOREIGN PATENT DOCUMENTS

| DE | 19611947 | 6/1997 |
|---|---|---|
| WO | 0235877 A1 | 5/2002 |
| WO | 2011099909 A1 | 8/2011 |

OTHER PUBLICATIONS

"3GPP TR 38.913 V14.0.0", 3rd Generation Partnership Project; Technical Specification Group Radio Access Network; Study on Scenarios and Requirements for Next Generation Access Technologies; (Release 14), Oct. 2016, pp. 1-39.
(Continued)

*Primary Examiner* — Erika A Washington
(74) *Attorney, Agent, or Firm* — Murphy, Bilak & Homiller, PLLC

(57) ABSTRACT

Embodiments herein relate to a method performed by a first access network node 411, for positioning of a wireless communication device 430. The method comprises obtaining a first and a second information relating to multilateration of the wireless communication device 430. The first information relating to multilateration comprises a first timing advance value, or a first indication of the first timing advance value, associated with the first access network node 411 and the wireless communication device 430, a Temporary Logical Link Identifier (TLLI) corresponding to the wireless communication device 430 and a first identity of a first cell 421, in which first cell 421 the first timing advance was obtained. The method further comprises mapping, based
(Continued)

on the TLLI, the associated first and second identities of the first and second cells 421, 422 and the first and second timing advance values to a network layer protocol connection on a first interface 441. The method further comprises transmitting, to a positioning node 413, the first and second timing advance values and the first and second identities of the first and second cells 421, 422. Embodiments herein further relate to corresponding methods in a second access network node 412 and in a positioning node 413.

16 Claims, 14 Drawing Sheets

(51) Int. Cl.
*H04W 64/00* (2009.01)
*H04W 76/11* (2018.01)
*G01S 5/00* (2006.01)
*G01S 5/06* (2006.01)
*H04W 56/00* (2009.01)

(52) U.S. Cl.
CPC ....... *H04W 56/0045* (2013.01); *H04W 64/00* (2013.01); *H04W 76/11* (2018.02)

(56) References Cited

OTHER PUBLICATIONS

"3GPP TS 23.003 V15.1.0", 3rd Generation Partnership Project; Technical Specification Group Core Network and Terminals; Numbering, addressing and identification (Release 15), Sep. 2017, pp. 1-109.
"3GPP TS 43.064 V13.2.0", 3rd Generation Partnership Project; Technical Specification Group GSM/EDGE Radio Access Network; General Packet Radio Service (GPRS); Overall description of the GPRS radio interface; Stage 2 (Release 13), May 2016, pp. 1-117.
"3GPP TS 48.018 V14.4.0", 3rd Generation Partnership Project; Technical Specification Group Radio Access Network; General Packet Radio Service (GPRS); Base Station System (BSS)—Serving GPRS Support Node (SGSN); BSS GPRS Protocol (BSSGP) (Release 14), Sep. 2017, pp. 1-217.
"3GPP TS 24.301 V13.3.0", 3rd Generation Partnership Project; Technical Specification Group Core Network and Terminals; Non-Access-Stratum (NAS) protocol for Evolved Packet System (EPS); Stage 3 (Release 13); Sep. 2015, pp. 1-394.
"3GPP TS 49.031 V13.0.0", 3rd Generation Partnership Project; Technical Specification Group GSM/EDGE Radio Access Network; Location Services (LCS); Base Station System Application Part LCS Extension (BSSAP-LE) (Release 13), Jan. 2016, pp. 1-52.
"3GPP TR 45.820 V13.1.0", 3rd Generation Partnership Project; Technical Specification Group GSM/EDGE Radio Access Network; Cellular system support for ultra-low complexity and low throughput Internet of Things (CIoT) (Release 13), Nov. 2015, pp. 1-145.
"New Work Item Positioning Enhancements for GERAN", 3GPP TSG RAN Meeting #72, RP-161260, revision of RP-161033, Busan, Korea, Jun. 13-16, 2016, pp. 1-8.
"Positioning enhancements for GERAN—introducing Timing Advance trilateration", 3GPP TSG RAN#72, RP-161034, Busan, Korea Source: Ericsson, Jun. 13-16, 2016, pp. 1-7.
"Radio Interface Enhancements for TA based multilateration (Update of RP-160034)", 3GPP TSG-RAN WG6 #1, R6-160085, Gothenburg, Sweden, Aug. 22-26, 2016, pp. 1-10.
"System level simulations for positioning enhancements—Methods and Results", 3GPP TSG RAN6#1, Tdoc R6-160012, Gothenburg, Sweden, Aug. 22-26, 2016, pp. 1-7.
"3GPP TS 48.071 V14.0.0", 3rd Generation Partnership Project; Technical Specification Group Radio Access Network; Location Services (LCS); Serving Mobile Location Centre—Base Station System (SMLC-BSS) interface; Layer 3 specification (Release 14), Mar. 2017, pp. 1-23.

* cited by examiner

NETWORK NODES AND METHODS THEREIN FOR MULTILATERATION

TECHNICAL FIELD

Embodiments herein relate to a network node and methods therein. In particular they relate to multilateration in a wireless communications network.

BACKGROUND

Wireless communication devices such as terminals are also known as e.g. User Equipments (UE), mobile terminals, wireless terminals and/or Mobile Stations (MS). These terms will be used interchangeably hereafter.

Wireless communication devices are enabled to communicate wirelessly in a wireless or cellular communications network or a wireless communication system, sometimes also referred to as a cellular radio system or a cellular network. The communication may be performed e.g. between two wireless communications devices, between a wireless communications device and a regular telephone and/or between a wireless communications device and a server via a Radio Access Network (RAN) and possibly one or more core networks, comprised within the wireless communications network.

Access network nodes, also referred to as access nodes, such as base stations, communicate over the air interface operating on radio frequencies with the wireless communication devices within range of the access network nodes. In the context of this disclosure, the expression Downlink (DL) is used for the transmission path from the access network node to the wireless communication devices. The expression Uplink (UL) is used for the transmission path in the opposite direction i.e. from the wireless communication devices to the access network node.

Further, each access network node may support one or several communications technologies or radio interfaces also referred to as Radio Access Technologies (RAT). Examples of wireless communication technologies are New Radio (NR), Long Term Evolution (LTE), Universal Mobile Telecommunications System (UMTS) and Global System for Mobile communications (GSM).

In a forum known as the Third Generation Partnership Project (3GPP), telecommunications suppliers propose and agree upon standards for networks and investigate various topics, such as enhanced data rate and radio capacity.

It is expected that in a near future, the population of Cellular IoT (Internet of Things) devices, such as wireless communication devices, will be very large. Various predictions exist, among which may be mentioned document 3GPP TR 45.820 V13.1.0, "Cellular system support for ultra-low complexity and low throughput Internet of Things (CIoT)" that assumes >60000 IoT devices per square kilometer, and document 3GPP TR 38.913 v 14.0.0, "Study on Scenarios and Requirements for Next Generation Access Technologies" that assumes 1000000 devices per square kilometer. A large fraction of these IoT devices are expected to be stationary, e.g., gas and electricity meters, vending machines, etc. EC-GSM-IoT and NB-IoT are two standards for Cellular IoT specified by 3GPP TSG GERAN and TSG RAN.

Positioning

Positioning enhancements for GERAN have been discussed, for example in document RP-161260, "New Work Item on Positioning Enhancements for GERAN", source Ericsson LM, Orange, MediaTek Inc., Sierra Wireless, Nokia. RAN #72. One candidate method for realizing improved accuracy when determining a position of a mobile station is Timing Advance (TA) multilateration which relies on establishing a position of the MS based on TA values in multiple cells. See for example document RP-161034, "Positioning Enhancements for GERAN—introducing TA trilateration", source Ericsson LM. RAN #72.

A proposal based on a similar approach to support positioning of NarrowBand internet-of Things (NB-IoT) mobiles has been made in document 3GPP TR 38.913 v 14.0.0, "Study on Scenarios and Requirements for Next Generation Access Technologies".

TA is a measure of the propagation delay between a base transceiver station (BTS) and the MS. The TA may be defined as the propagation delay between the base station and the wireless device and back to the base station again, i.e. TA=PDL+PUL where PDL is the downlink propagation delay and PUL is the uplink propagation delay. Since the speed by which radio waves travel is known, the distance between the BTS and the MS may be derived. Further, if multiple BTSs each measure a respective TA to the same MS and the positions of these BTSs (i.e. longitude and latitude) are known, the position of the MS may be derived. Measurement of TA requires that the MS synchronizes to each BTS used during the Multilateration procedure and transmits a signal time-aligned with the timing of each BTS (as estimated by the MS). The BTS then measures the time difference between its own time reference, and the timing of the signal received from the MS on each of the BTS. As mentioned above this time difference is equal to two times the propagation delay between the BTS and the MS, one propagation delay of the BTS's synchronization signal to the MS, plus one equally large propagation delay of the signal transmitted by the MS back to the BTS, and is used to determine a BTS specific TA value.

Once a set of TA values are established, the position of the MS may be derived through so called Multilateration where the position of the device is determined by the intersection of a set of hyperbolic curves associated with each BTS, see FIG. 1. The calculation of the position of the MS is typically carried out by a positioning node, such as an Serving Mobile Location Center (SMLC), which implies that all of the derived timing advance and corresponding cell identity information is to be sent to the positioning node that initiated the procedure, i.e. the serving SMLC.

Herein the following definitions are used:

Foreign BTS: A BTS associated with a first Base Station System (BSS) that uses a positioning node that is different from the positioning node used by a second BSS that manages the cell serving the MS when the positioning procedure is initiated. In this case the derived timing advance information and identity of the corresponding cell are relayed to the serving positioning node using the core network, since in this case the first BSS has no context for the MS.

Local BTS: A BTS associated with a first BSS that is different than the second BSS that manages the cell serving the MS when the positioning procedure is initiated. However, the first BSS associated with the local BTS uses the same positioning node as the second BSS. In this case the derived timing advance information and identity of the corresponding cell are relayed to the serving positioning node using the core network, i.e. in this case the first BSS has no context for the MS.

Serving BTS: A BTS associated with the second BSS that manages the cell serving the MS when the positioning procedure is initiated. In this case the derived timing advance information and identity of the corresponding cell are sent directly to the serving positioning node, i.e. in this case the BSS has a context for the MS.

Serving SMLC node: The SMLC node that commands a MS to perform the Multilateration procedure, i.e. it sends an RRLP Multilateration Request to the MS. The RRLP Multilateration Request may be tunneled to the MS via the serving BSS.

Serving BSS: The BSS associated with the serving BTS, i.e. the BSS that has context information for the Temporary Logical Link Identifier (TLLI) corresponding to the MS for which the Multilateration procedure has been triggered. The TLLI provides the signaling address used for communication between the user equipment and the SGSN (Serving GPRS Support Node) and is specified in 3GPP specification 23.003

Non-serving BSS: A BSS associated with a Foreign or Local BTS, i.e. a BSS that does not have context information for the TLLI corresponding to the MS for which the Multilateration procedure has been triggered.

SUMMARY

It is an object of embodiments herein to solve at least some of the problems mentioned above, and to improve the performance of a wireless communications network.

Embodiments herein may for example reduce power consumption of a wireless communication device, such as an MS.

According to a first aspect of embodiments herein it is provided a method performed by a first access network node, for positioning of a wireless communication device. The first access network node is serving the wireless communication device. The first access network node obtains a first and a second information relating to multilateration of the wireless communication device. The first information relating to multilateration comprises a first timing advance value, or a first indication of the first timing advance value, associated with the first access network node and the wireless communication device, a Temporary Logical Link Identifier (TLLI) corresponding to the wireless communication device and a first identity of a first cell, in which first cell the first timing advance was obtained. The second information relating to multilateration comprises a second timing advance value, or a second indication of the second timing advance value, associated with the second access network node and the wireless communication device, a Temporary Logical Link Identifier (TLLI) corresponding to the wireless communication device and a second identity of a second cell, in which second cell the second timing advance was obtained. The first access network node maps the first TLLI, the associated first identity of the first cell and the first timing advance value to a network layer protocol connection on a first interface. The first access network node further maps the second TLLI, the associated second identity of the second cell and the second timing advance value to a network layer protocol connection on a first interface. The first access network node transmits the first timing advance and the first identity of the first cell to a positioning node. The first access network node further transmits the second timing advance and the second identity of the second cell to a positioning node.

According to a second aspect of embodiments herein it is provided a first access network node, for performing a method for positioning of a wireless communication device. The first access network node is serving the wireless communication device. The first access network node is configured to obtain a first and a second information relating to multilateration of the wireless communication device. The first information relating to multilateration comprises a first timing advance value, or a first indication of the first timing advance value, associated with the first access network node and the wireless communication device, a Temporary Logical Link Identifier (TLLI) corresponding to the wireless communication device and a first identity of a first cell, in which first cell the first timing advance was obtained. The second information relating to multilateration comprises a second timing advance value, or a second indication of the second timing advance value, associated with the second access network node and the wireless communication device, a Temporary Logical Link Identifier (TLLI) corresponding to the wireless communication device and a second identity of a second cell, in which second cell the second timing advance was obtained. The first access network node is further configured to map the first TLLI, the associated first identity of the first cell and the first timing advance value to a network layer protocol connection on a first interface. The first access network node is further configured to map the second TLLI, the associated second identity of the second cell and the second timing advance value, to the network layer protocol connection on the first interface. The first access network node is further configured to transmit the first timing advance and the first identity of the first cell and the second timing advance and the second identity of the second cell to a positioning node.

According to a third aspect of embodiments herein it is provided a method performed by a second access network node, for positioning of a wireless communication device. The second access network node is not serving the wireless communication device. The second access network node obtains a second information relating to multilateration of the wireless communication device. The second information relating to multilateration comprises a second timing advance value, or a second indication of the second timing advance value, associated with the second access network node and the wireless communication device, a second Temporary Logical Link Identifier (TLLI) corresponding to the wireless communication device and a second identity of a first cell, in which first cell the first timing advance was obtained. The second access network node further transmits the second information to a first access network node.

According to a fourth aspect of embodiments herein it is provided a second access network node, for performing a method for positioning of a wireless communication device. The second access network node is not serving the wireless communication device. The second access network node is configured to obtain a second information relating to multilateration of the wireless communication device. The second information relating to multilateration comprises a second timing advance value, or a second indication of the second timing advance value, associated with the second access network node and the wireless communication device, a second Temporary Logical Link Identifier (TLLI) corresponding to the wireless communication device and a second identity of a first cell, in which first cell the first timing advance was obtained. The second access network node is further configured to transmit the second information to a first access network node.

According to a fifth aspect of embodiments herein it is provided a method performed by a positioning node, for positioning of a wireless communication device. The positioning node receives a first timing advance and a first identity of a first cell from a first access network node. The positioning node further receives a second timing advance and a second identity of a second cell from the first access network node. The positioning node further determines the position of the wireless communication device based on the received first timing advance and the first identity of the first cell and the received second timing advance and the second identity of the second cell.

According to a sixth aspect of embodiments herein it is provided a positioning node for performing a method for positioning of a wireless communication device. The positioning node is configured to receive a first timing advance and a first identity of a first cell, from a first access network node. The positioning node is further configured to receive a second timing advance and a second identity of a second cell, from the first access network node. The positioning node is further configured to determine the position of the wireless communication device based on the received first timing advance and the first identity of the first cell and the received second timing advance and the second identity of the second cell.

Since the first access network node transmits the first timing advance and the first identity of the first cell to the positioning node and the second timing advance and the second identity of the second cell to the positioning node using the network layer protocol connection, the signaling required for positioning of the wireless communication device is reduced. Therefore the power consumption of the wireless communication device is reduced and the performance of the wireless communications network is improved.

DETAILED DESCRIPTION

Figure 1:
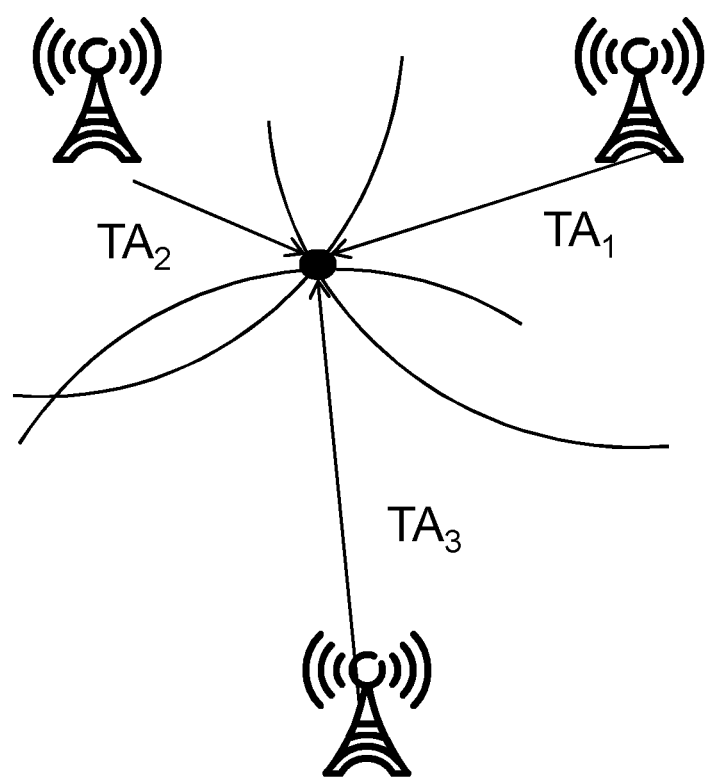
FIG. 1 is a block diagram depicting an access network node for performing a method for positioning of a wireless communication device.

Several options regarding the signaling and detailed procedure for the above mentioned multilateration procedure has been discussed. On a high level, two options referred to as Network assisted method and MS autonomous method have been discussed. In the network assisted method the network determines the base stations to be used for Multilateration based on a measurement report from the MS, while in the MS autonomous method the MS determines the cells to be used based on signal strength. Such a method is disclosed in document 3GPP TSG RANG, R6-160012, System level simulations for positioning enhancements—Methods and Results, source Ericsson LM.

In prior art the SMLC gathers timing advance information from several BSSs. A problem with that is that is realized by the MS first acquiring all the required timing advance information and then sending it to the SMLC using a RRLP message. This legacy method is undesirable due to the increased battery consumption it places on the MS, e.g due to the need for the MS to acquire the timing advance information and send it to the SMLC using a RRLP message. In order to complete the multilateration procedure the MS receives information from the BTS, associated with the BSS, of each cell used during the positioning procedure informing it of the TA and Cell ID applicable to that cell. Further the MS sends an RRLP message to the SMLC which RRLP message comprising all of the collected information, which may require multiple Radio Link Control (RLC) data blocks and may need to be repeated if extended coverage class operation is required by the MS. Such a prior art method will now be illustrated in relation to FIG. 2, in which a signaling for the MS autonomous method is illustrated.

In action 201 an SGSN 221 transmits a BSSGP PERFORM-LOCATION-REQUEST to a BSC comprised in a BSS 222. The BSS 222 serves an MS 223.

In action 202 the BSS 222 transmits a BSSMAP-LE Perform Location Request to a serving SMLC 224.

In action 203 the SMLC 224 triggers a Multilateration procedure by sending an RRLP Multilateration Request message to the MS 223.

In action 204 the MS sends the Measurement report as an RRLP message carried within an LLC PDU sent to the SGSN 221. The SGSN 221 extracts the RRLP message from the LLC PDU and relays it to the serving BSS 222 within a BSSGP PDU. The BSS 222 then forwards the RRLP message to the serving SMLC 224. The intermediate steps are not shown in action 204. The RRLP message comprises cell IDs and associated timing advance values used by the serving SMLC 224 for calculation of the position of the MS 223. BSSGP is used for transfer of messages between the SGSN 221 and the BSS 222, see 3GPP TS 48.018.

In action 205 the SMLC 224 then sends a "BSSMAP-LE Perform Location Response" message to the BSS 222, and includes the determined location information in the "Location Estimate" IE.

In action 206 the BSS 222 sends the SGSN 221 a "BSSGP PERFORM-LOCATION-RESPONSE PDU" message that comprises the identified MS location in the "Location Estimate" IE.

Figure 2:
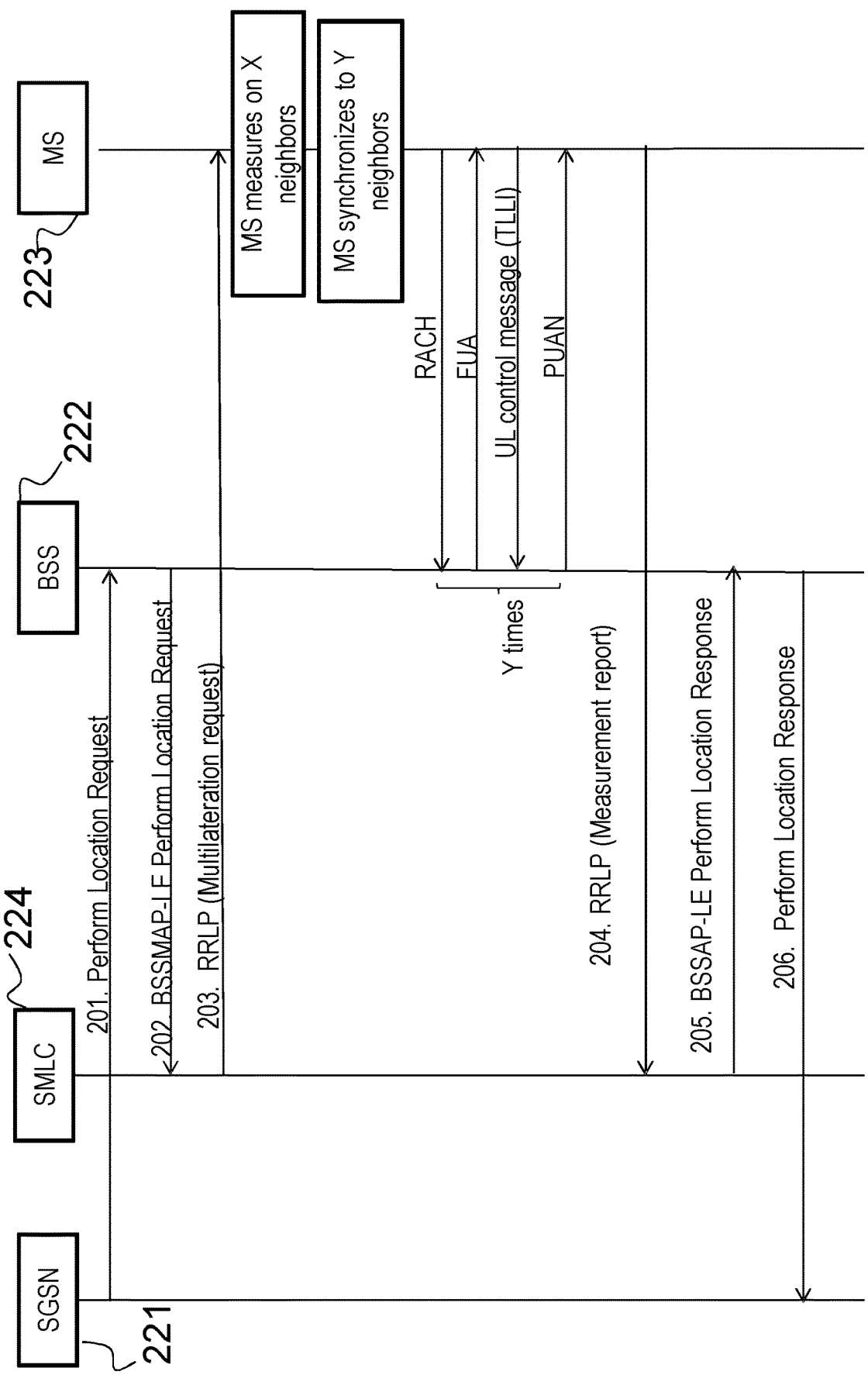
FIG. 2 is a flow diagram of signaling for an MS-autonomous method of positioning of a wireless communication device.

With the signaling of FIG. 2 the MS consumes a lot of battery in order to complete the multilateration procedure since the MS receives information from the BTS, associated with the BSS, of each cell used during the positioning procedure informing it of the TA and Cell ID applicable to that cell. Further the MS sends an RRLP message to the SM LC which RRLP message comprises all of the collected information, which may require multiple Radio Link Control (RLC) data blocks and may need to be repeated if extended coverage class operation is required by the MS, see 3GPP TS 43.064 v13.2.0, General Packet Radio Service (GPRS); Overall description of the GPRS radio interface; Stage 2.

Several optimizations have also been discussed to reduce the power consumption of IoT devices, e.g. 3GPP TSG RANG, R6-160085, Radio Interface Enhancements for TA based multilateration, source Nokia.

Further, a non-serving BSS may send a CONNECTIONLESS INFORMATION message comprising the derived timing advance information and identity of the corresponding cell to the serving MSC via BSSAP. The serving MSC may relay this information to the serving BSS which then may forward the derived Timing Advance value and associated CELL ID to the serving SMLC node.

There are several problems with the above described procedures, e.g.:
(i) Existing Location Services (LCS) related messages are not adapted to transfer the information required for Multilateration (e.g. TLLI, derived Timing Advance value and Cell ID) from the non-serving BSS to the serving BSS or from the serving BSS to the serving SM LC node.
(ii) The only route for transfer of the required information is via the MSC which implies that at some point in the future when the Circuit Switched (CS) domain is turned off it will no longer be possible to complete the procedure.

Embodiments herein relate to a Multilateration method wherein the set of access nodes involved in Multilateration acquire the necessary timing advance information and send it to a positioning node, thereby avoiding the need for a wireless communication device to acquire the necessary timing advance information and send it to the positioning node using an RRLP message.

Even though EC-GSM-IoT will be used herein as examples of a RAT in which embodiments herein may be implemented, it may be possible to apply the embodiments described herein to other RATs. Such RATs may e.g. in particular be Narrow Band Internet of Things (NB-IoT), formerly known as Narrow Band LTE (NB-LTE) and NB Cellular system support for ultra-low complexity and low throughput Internet of Things NB-CIoT, as defined in 3GPP Technical Report 45.820 on Cellular system support for ultra-low complexity and low throughput Internet of Things (CIoT), chapter 7.3 and 7A. Other NAS protocols may be used such as the NAS protocol for Evolved Packet System described in 3GPP TS 24.301 v13.3.0, Technical Specification Group Core Network and Terminals; Non-Access-Stratum (NAS) protocol for Evolved Packet System (EPS); Stage 3.

In a general context, the embodiments disclosed herein are also applicable to other standards such as NB-IoT, LTE and UMTS implementing Multilateration were the source identity of the serving controller node needs to be provided to the non-serving controller node with the difference that the names of the actual controller node and messages may be different.

In the context of saving energy it may be advantageous to eliminate action 204 in FIG. 2 in order to save energy otherwise needed to transmit the Measurement report from the MS to the SM LC as an RRLP message.

Figure 3:
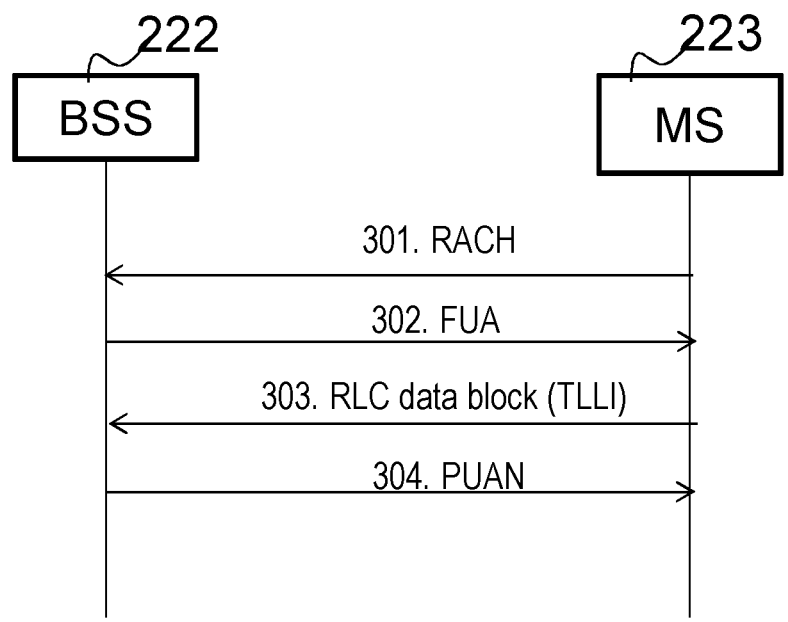
FIG. 3 illustrates a procedure for a serving BSS to determine a Timing Advance value for an EC-GSM-IoT supporting device.

This may be achieved by having the BSS collect the timing advance values and send them to the serving positioning node, i.e. serving SMLC. One procedure to determine the timing Advance value is illustrated FIG. 3 for a serving BSS and an EC-GSM-IoT supporting device.

The actual timing advance value estimation is carried out by the BTS and may be done on the access burst in the first RACH message transmitted in action 301. An uplink Temporary Block Flow (TBF) is assigned to the MS by the Fixed Uplink Allocation (FUA) in action 302. The timing advance value estimation may be further refined using also the four normal bursts used to send 303 the Radio Link Control (RLC) data block carrying the TLLI assigned by the FUA. The RLC data block also carries "Source Identity" information which identifies the serving BSS to which the BSS is to relay the timing advance information and the corresponding Cell ID information. Thereafter the timing advance information and the corresponding Cell ID information may be sent from the serving BSS to the serving SM LC for calculation of the MS position.

Figure 4A:
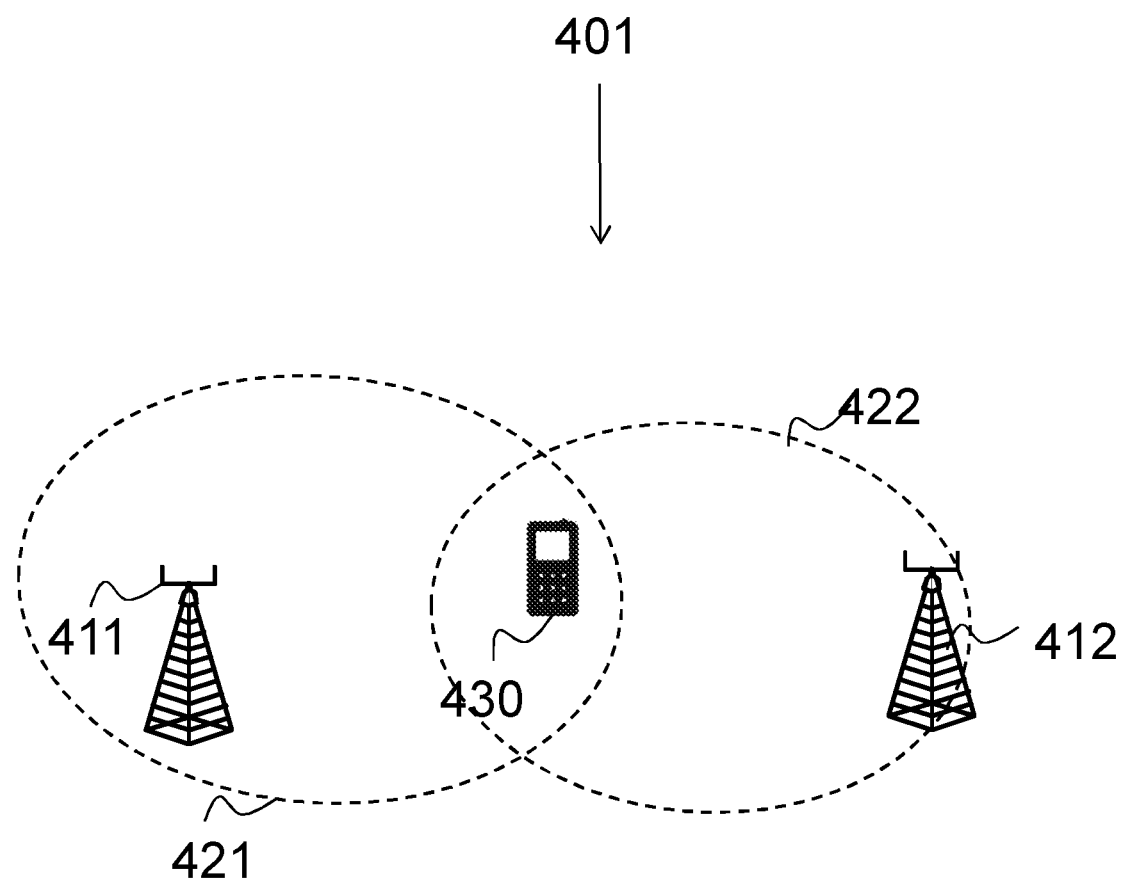
FIGS. 4a and 4b depict various aspects of an exemplary wireless communications network.
Figure 4B:
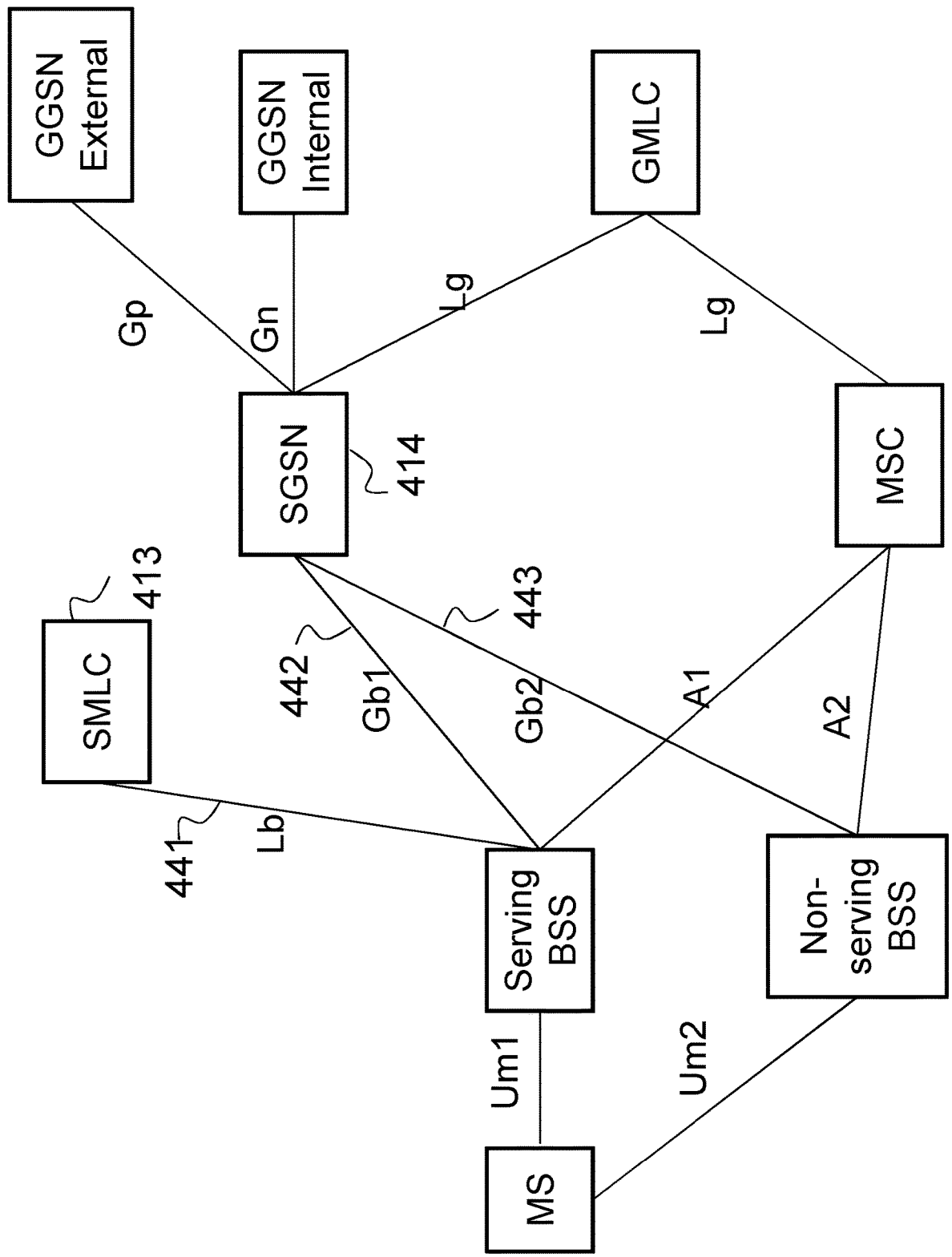

Embodiments herein may be implemented in one or more wireless communications networks. FIGS. 4a and 4b depict parts of such a wireless communications network 401. The wireless communications network 401 may for example be an EC-GSM-IoT network, any 3GPP or any cellular wireless communications network or system. EC-GSM-IoT will hereafter be used to exemplify the embodiments although the embodiments are thus not limited thereto.

The wireless communications network 401 comprises a plurality of base stations and/or other network nodes. More specifically, the wireless communications network 401 comprises a first access network node 411, such as a radio access network node.

The wireless communications network 401 may further comprise a second access network node 412, such as a second radio access network node.

The term "network node" may correspond to any type of radio network node or any network node, which communicates with at least a radio network node. For example, the first access network node 411 and the second access network node 412 may each be a Base Station System (BSS), or a base station, such as an eNB. The base station may also be referred to as a NodeB, an evolved Node B (eNB, eNode B), a base transceiver station (BTS), Access Point (AP) Base Station, Wi-Fi AP, base station router, or any other network unit capable of communicating with a wireless communication device within a cell served by the base station depending e.g. on the radio access technology and terminology used.

The wireless communications network 401 further comprises a positioning node 413. The positioning node 413 is responsible for positioning of the wireless communication device 430. The positioning node 413 may for example be an SMLC node, or an Evolved SM LC (E-SM LC) used for LTE.

The wireless communications network 401 may further comprise a core network node 414, such as an SGSN node, or an MME.

In embodiments herein the first access network node 411 serves wireless communications devices, such as a wireless communications device 430.

The wireless communications device 430 may further be e.g. a mobile terminal or a wireless terminal, a mobile phone, a computer such as e.g. a laptop, a Personal Digital Assistants (PDAs) or a tablet computer, sometimes referred to as a surf plate, with wireless capability, target device, device to device UE, Machine Type Communication UE or UE capable of machine to machine communication, iPad, mobile terminals, smart phone, Laptop Embedded Equipment (LEE), Laptop Mounted Equipment (LME), USB dongles etc. or any other radio network units capable to communicate over a radio link in a wireless communications network.

Please note the term User Equipment used in this disclosure also covers other wireless devices such as Machine to machine (M2M) devices, even though they are not operated by any user.

The first access network node 411 may be a serving access network node, such as a serving BSS, since it has access to context information for a TLLI corresponding to the wireless communication device 430 for which a positioning procedure, such as multilateration, of the wireless communication device 430 is initiated.

Further the first access network node 411 manages a first cell 421 serving the wireless communication device 430 when the positioning procedure of the wireless communication device 430 is initiated. A first timing advance value may be associated with the wireless communication device 430 and the first cell 421.

The second access network node 412 may be a non-serving access network node, such as a non-serving BSS, since the second access network node 412 does not have access to context information for the TLLI corresponding to the wireless communication device 430.

Further the second access network node 412 manages a second cell 422. A second timing advance value may be associated with the wireless communication device 430 and the second cell 422.

A cell is a geographical area where radio coverage is provided by network node equipment such as W-Fi AP equipment, base station equipment at a base station site or at remote locations in Remote Radio Units (RRU). The first access network node 411 and the second access network node 412 may each be an example of such network node equipment.

Radio beams may have a similar function as the cells described above.

Network nodes, such as base stations and Wi-Fi AP, communicate over the air or radio interface operating on radio frequencies with wireless communication devices within range of the network nodes. The wireless communication devices transmit data over the radio interface to network nodes, such base stations and Wi-Fi AP, in UL transmissions, and network nodes, such as Wi-Fi AP and base stations, transmit data over an air or radio interface to the wireless communication devices in DL transmissions.

The first access network node 411 may communicate with the second access network node 412, via the core network node 414.

The first access network node 411 may further communicate with the positioning node 413, e.g. over a first interface 441, such as an Lb interface. The first access network node 411 may communicate with the core network node 414, e.g. over a second interface 442, such as a Gb interface. The second access network node 412 may also communicate with the core network node 414, e.g. over a third interface 443, such as a Gb interface.

In this section, embodiments, such as methods for positioning, will be illustrated in more detail by a number of exemplary embodiments. The following embodiments will be described using EC-GSM-IoT as an example and the first access network node 411 will be a serving BSS. The second access network node 412 will be a non-serving BSS. The positioning node 413 will be an SMLC node and the core network node 414 will be an SGSN.

It should be noted that these embodiments are not mutually exclusive. Components from one embodiment may be tacitly assumed to be present in another embodiment and it will be obvious to a person skilled in the art how those components may be used in the other exemplary embodiments.

After the timing advance value has been determined the serving BSS may forward the timing advance value and associated Cell ID to the serving SMLC node. This may be achieved since the serving BSS already has a context associated with this TLLI, established when the serving BSS sent the BSSMAP-LE Perform Location Request to the serving SMLC. The context allows the serving BSS to map the TLLI and associated Cell ID and timing advance value to a particular Signalling Connection Control Part (SCCP) connection on the Lb interface.

The SCCP is a network layer protocol that provides extended routing, flow control, segmentation, connection-orientation, and error correction facilities in Signaling System 7 telecommunications networks. SCCP relies on the services of Multimedia Transfer Protocol (MTP) for basic routing and error detection.

A non-serving BSS, on the other hand, may also include the TLLI when sending the timing advance value and associated Cell ID information to the serving BSS (via the MSC) in order for the serving BSS to be able to map the received information to the correct SCCP connection across the Lb interface.

One message for each estimated TA value.

Figure 5:
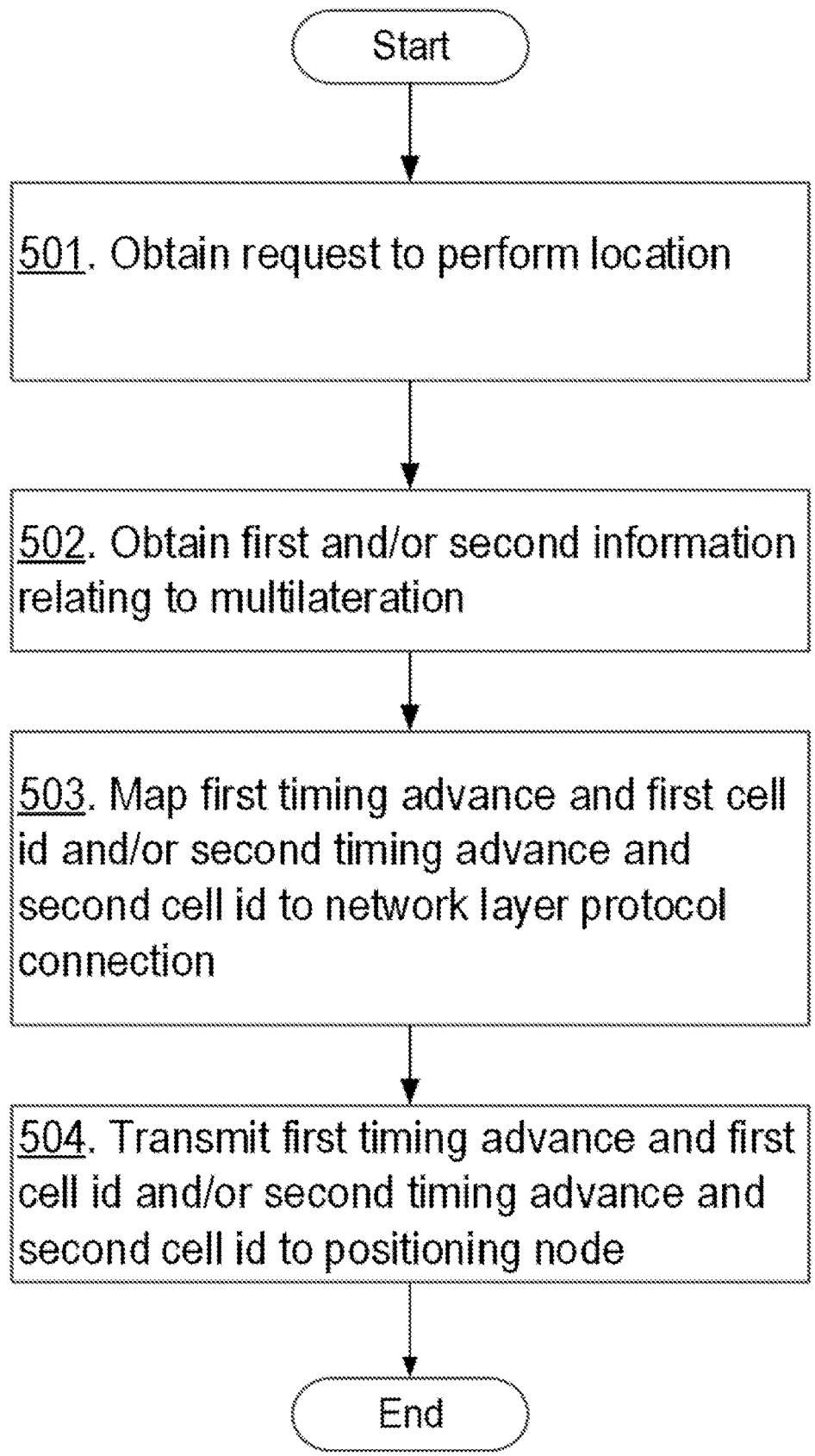
FIG. 5 illustrates a method, performed by a first access network node, for positioning of a wireless communication device, such as by multilateration.

The following embodiments are related to the first access network node 411. The first access network node 411 embodiments relate to FIGS. 5 and 11.

According to an aspect of embodiments herein it is provided a method for operating the first access network node 411, e.g. for multilateration, in the wireless communications network 401. The method for operating the first access network node 411 may also be referred to as a method performed by the first access network node. The access network node may for example be a BSS, such as a serving BSS. The method may be a method for positioning, such as multilateration, of a wireless communication device, such as an MS. The first access network node 411 may:

obtain 501 a request to perform a location procedure, such as a Perform Location request, from the core network node 414.

The first access network node 411 may obtain the request by receiving it from the core network node 414 and/or from the positioning node 413. The request to perform the location procedure may be tunneled to the wireless communication device 430 via the first access network node 411, such as the BSS, and in the tunneling the positioning method may indicted. When the request to perform the location procedure is obtained by the first access network node 411 it acts as a trigger that a positioning procedure is ongoing and starts a related procedure timer.

obtain 502 a first information relating to multilateration of the wireless communication device 430. The first information relating to multilateration may comprise a first timing advance value, or a first indication of the first timing advance value, associated with the first access network node 411 and the wireless communication device 430, a TLLI corresponding to the wireless communication device 430 and a first identity of the first cell 421 in which first cell 421 the first timing advance was obtained. The first access network node 411 may obtain the first information internally from a memory 1190. The first timing advance value may further be obtained as mentioned above. The first timing advance value may e.g. be obtained by the first access network node determining the first timing advance value. The first access network node 411 may further obtain a second information relating to multilateration of the wireless communication device 430. The second information may comprise a second timing advance value, or a second indication of the second timing advance value, associated with the second access network node 412 and the wireless communication device 430, a second TLLI corresponding to the wireless communication device 430, e.g. the same TLLI as above, and a second identity of the second cell 422 in which second cell 422 the second timing advance was obtained. The wording "second TLLI" used herein shall be interpreted as the TLLI obtained from the second access network node 412, the TLLI is however the same as the TLLI comprised in the first information relating to multilateration as long as the first and the second access network nodes are comprised in the same routing area.

The first access network node 411 may obtain the second timing advance, the second TLLI and the second identity of the second cell 422 by receiving them from the second access network node 412. How the first access network node 411 may receive the second timing advance, the second TLLI and the second identity of the second cell 422 will be described further below in a number of exemplary embodiments.

This action may be performed by means such as an obtaining module 1110 in the first access network node 411. The obtaining module 1110 may be implemented by a processor 1180 in the first access network node 411.

map 503 the first TLLI and the associated first identity of the first cell 421 and the first timing advance value to a network layer protocol connection, such as an SCCP connection, on the first interface 441, such as the Lb interface. Mapping the first TLLI and the associated first identity of the first cell 421 and the first timing advance value may comprise determining the network layer protocol connection on the first interface 441 to be used for transmitting the associated first identity of the first cell 421 and the first timing advance value to the positioning node 413.

The mapping and/or the determining may be based on the TLLI. For example, the first access network node 411 may determine the network layer protocol connection on the first interface 441 based on the TLLI.

The first access network node 411 may further map the second TLLI and the associated second identity of the second cell 422 and the second timing advance value to the network layer protocol connection, such as the SCCP connection, on the first interface 441, such as the Lb interface.

This action may be performed by means such as a mapping module 1120 in the first access network node 411. The mapping module 1120 may be implemented by the processor 1180 in the first access network node 411.

transmit 504 the first timing advance and the first identity of the first cell 421 to the positioning node 413.

The first access network node 411 may further transmit the second timing advance and the second identity of the second cell 422 to the positioning node 413.

The first timing advance and the first identity of the first cell 421 and/or the second timing advance and the second identity of the second cell 422 may be transmitted using the network layer protocol connection, such as the SCCP connection. E.g. information transmitted by a non-serving BSS may be routed thru the serving BSS and therefore the same SCCP connection to the serving SMLC may be used.

In some embodiments, the first access network node 411 transmits the first timing advance and the first identity of the first cell 421 and/or the second timing advance and the second identity of the second cell 422 to the positioning node 413 by transmitting a BSSMAP-LE CONNECTION ORIENTED INFORMATION message comprising the first timing advance and the first identity of the first cell 421 and/or the second timing advance and the second identity of the second cell 422.

In some further embodiments, the BSSMAP-LE CONNECTION ORIENTED INFORMATION message comprises a BSSLAP message to be carried in a Base Station Subsystem Location Services Application Part (BSSLAP) Application Protocol Data Unit (APDU) IE, which BSSLAP message comprises the first timing advance and the first identity of the first cell 421 and/or the second timing advance and the second identity of the second cell 422.

By transmitting the BSSMAP-LE CONNECTION ORIENTED INFORMATION" message prior art action 204 is avoided and therefore the wireless communications device 430 is able to reduce its power consumption.

This action may be performed by means such as a transmitting module 1130 in the first access network node 411. The transmitting module 1130 may be implemented by the processor 1180 in the first access network node 411.

Embodiments herein may be performed in the first access network node 411. The first access network node 411 may comprise the modules mentioned above and depicted in FIG. 11.

The followings are embodiments related to the second access network node 412.

Figure 6:
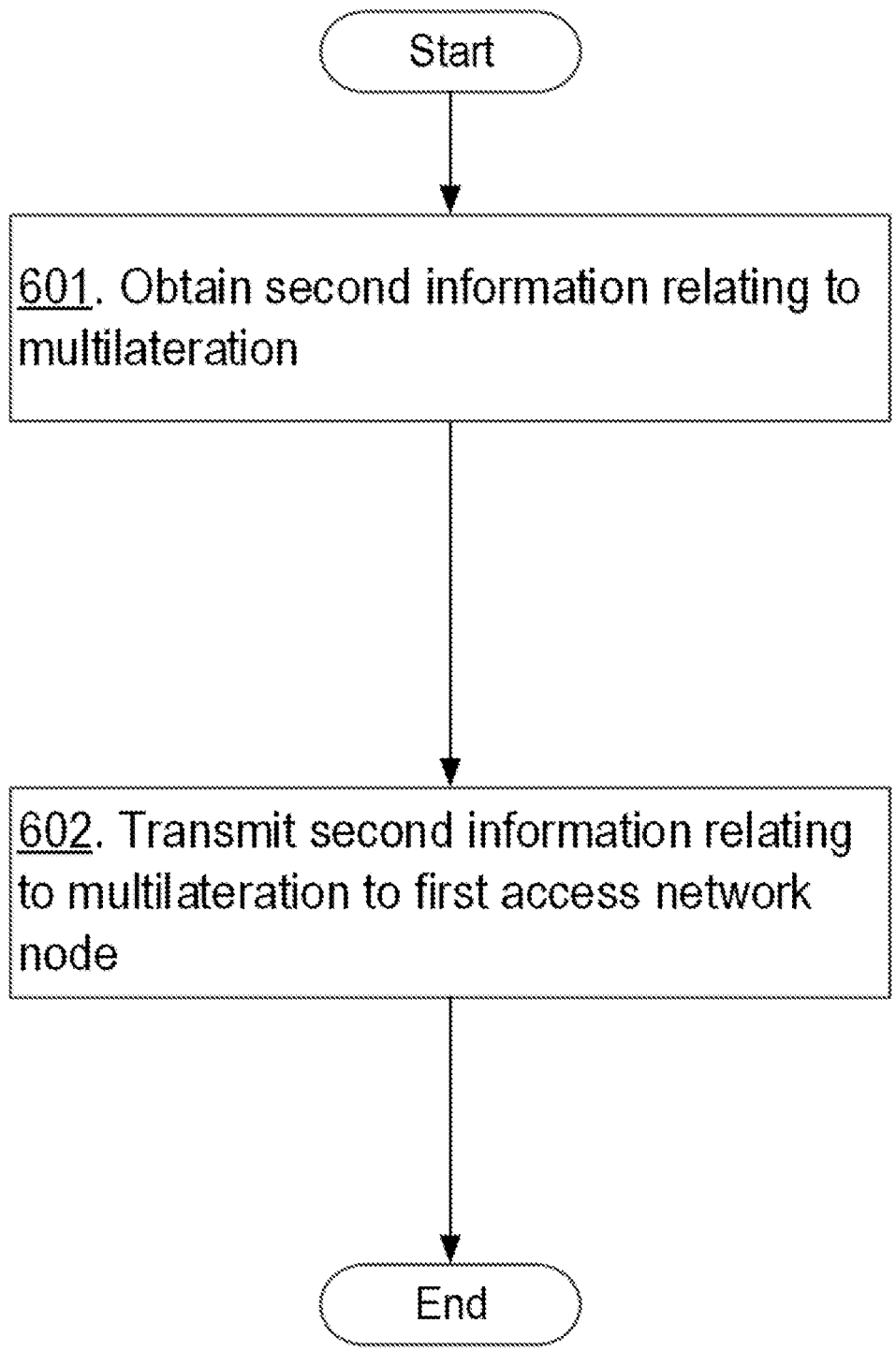
FIG. 6 illustrates a method, performed by a second access network node, for positioning of a wireless communication device, such as by multilateration.
Figure 12:
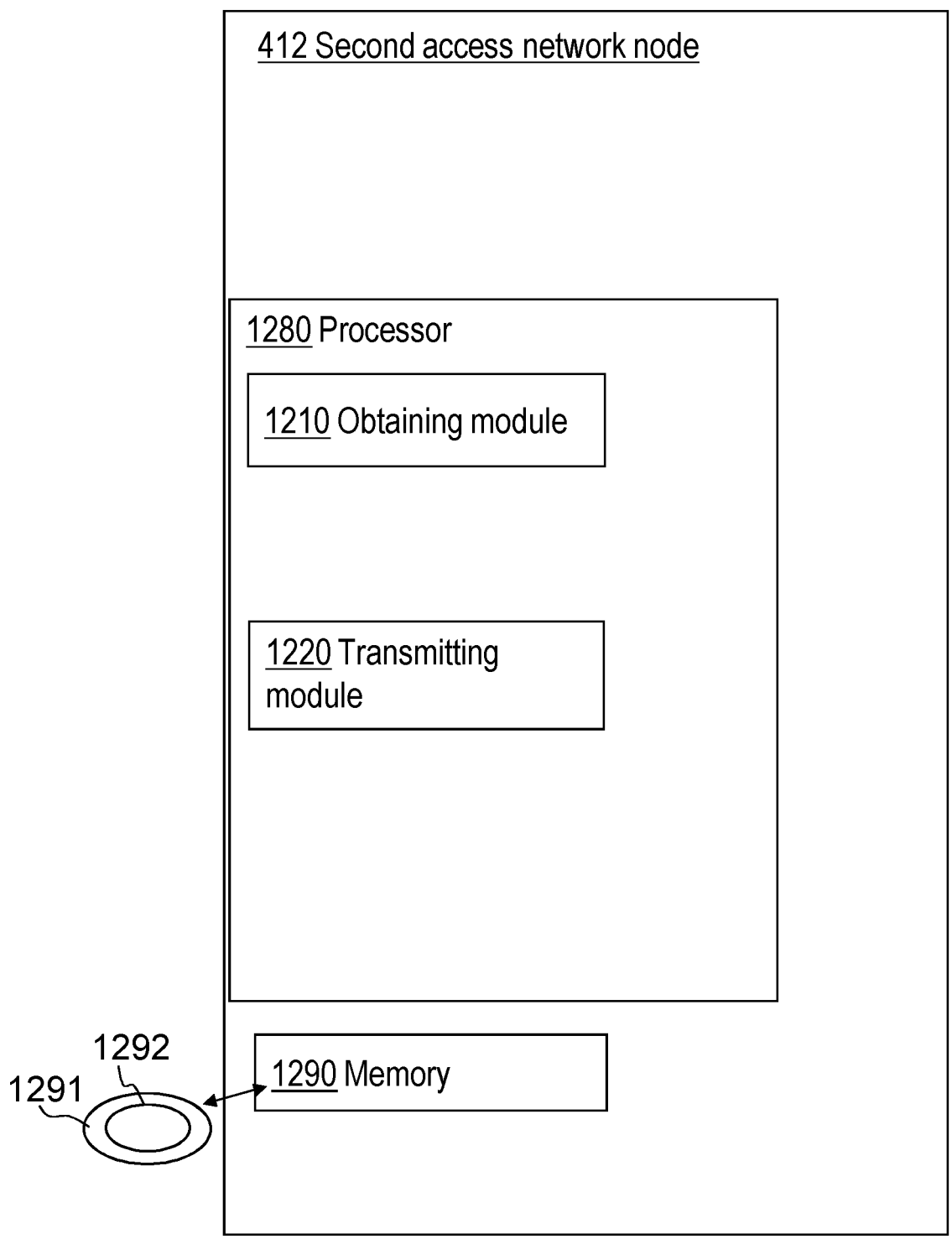
FIG. 12 illustrates an exemplary second access network node according to various embodiments described herein.

The second access network node 412 embodiments relate to FIGS. 6 and 12. According to an aspect of embodiments herein it is provided a method for operating the second access network node 412, e.g. for multilateration, in the wireless communications network 401. The method for operating the second access network node 412 may also be referred to a method performed by the second access network node 412. The access network node may for example be a BSS, such as a non-serving BSS. The method may be a method for positioning, such as multilateration, of a wireless communication device, such as an MS. The second access network node 412 may:

obtain 601 the second information relating to multilateration of the wireless communication device 430. The second information may comprise the second timing advance value, or the second indication of the second timing advance value, associated with the second access network node 412 and the wireless communication device 430, the second TLLI corresponding to the wireless communication device 430, e.g. the same TLLI as above, and the second identity of the second cell 422 in which second cell 422 the second timing advance was obtained. The wording "second TLLI" used herein shall be interpreted as the TLLI obtained by the second access network node 412, the TLLI is however the same as the TLLI comprised in the first information relating to multilateration as long as the first and the second access network nodes are comprised in the same routing area.

The second access network node 412 may obtain the second timing advance as described above. The second access network node 412 may e.g. determine the second timing advance value.

This action may be performed by means such as an obtaining module 1210 in the second access network node 412. The obtaining module 1210 may be implemented by a processor 1280 in the second access network node 412.

transmit 602 the second information to the first access network node 411.

The second access network node 412 may transmit the second information to the first access network node 411 by transmitting a BSSMAP-LE CONNECTIONLESS INFORMATION message comprising the second information.

In some further embodiments, the BSSMAP-LE CONNECTIONLESS INFORMATION message comprises a BSSLAP message to be carried in a BSSLAP APDU IE, which BSSLAP message comprises the second information.

This action may be performed by means such as a transmitting module 1220 in the second access network node 412. The transmitting module 1220 may be implemented by the processor 1280 in the second access network node 412.

Embodiments herein may be performed in the second access network node 412. The second access network node 412 may comprise the modules mentioned above and depicted in FIG. 12.

The followings are embodiments related to the positioning node 413.

Figure 7:
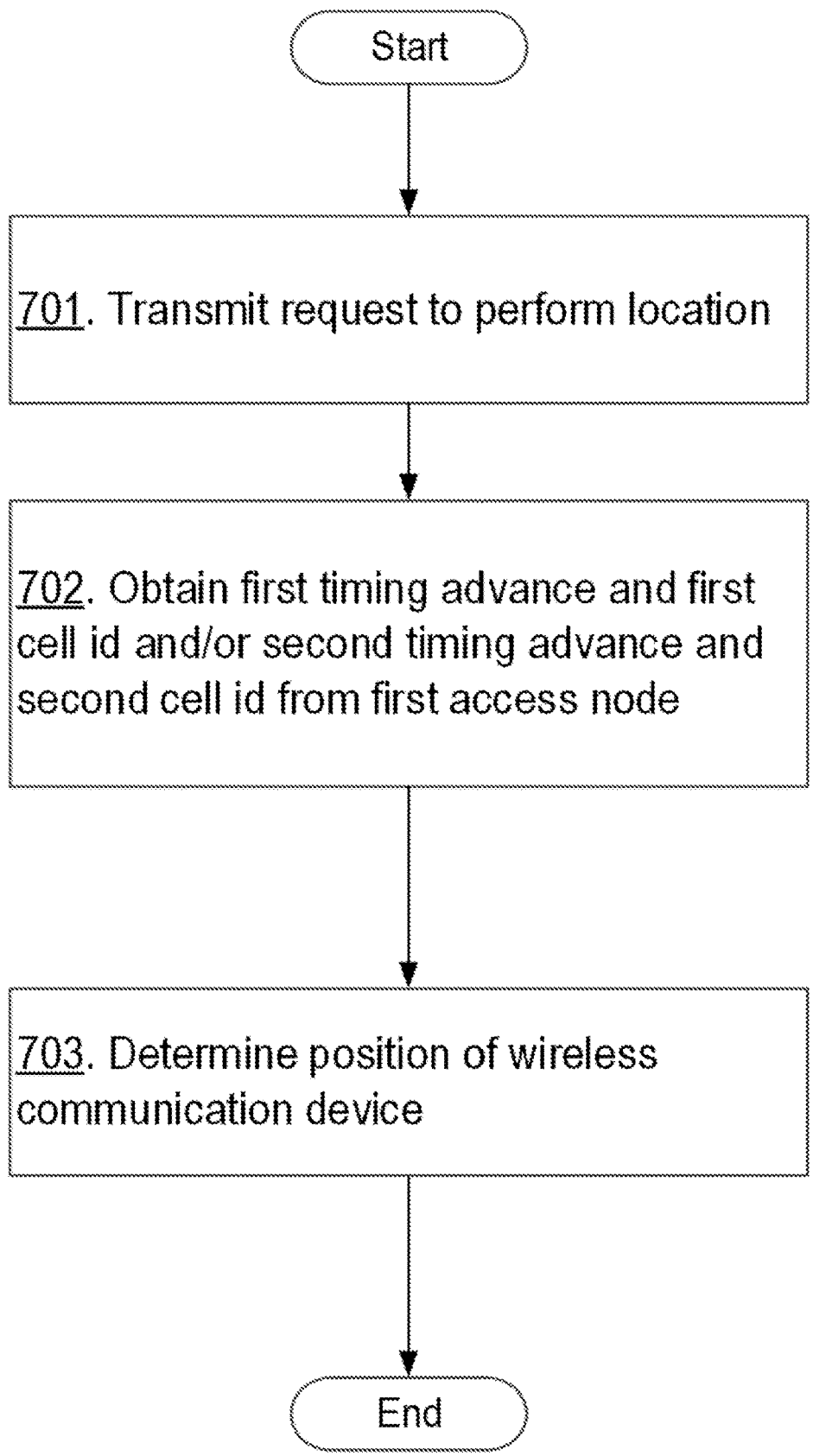
FIG. 7 illustrates a method, performed by positioning node, for positioning of a wireless communication device, such as by multilateration.
Figure 13:
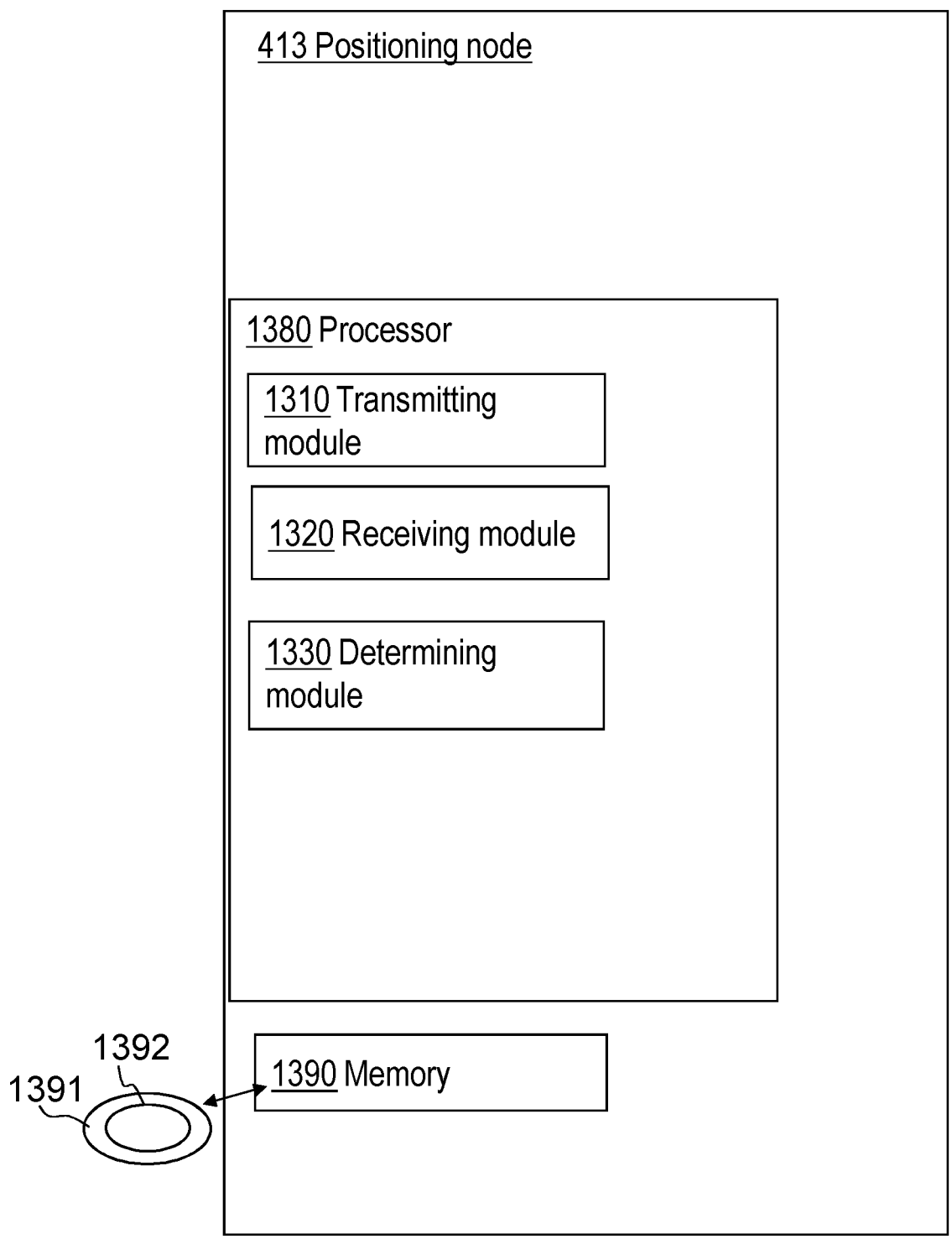
FIG. 13 illustrates an exemplary positioning node according to various embodiments described herein."

The positioning node 413 embodiments relate to FIGS. 7 and 13.

According to an aspect of embodiments herein it is provided a method for operating the positioning node 413, e.g. for multilateration, in the wireless communications network 401. The method for operating the positioning node 413 may also be referred to as a method performed by the positioning node 413. The positioning node may for example be an SM LC. The method may be a method for positioning, such as multilateration, of a wireless communication device, such as an MS. The positioning node 413 may:

transmit 701 a request to perform location procedure, such as a Perform Location request, to the first access network node 411. The request to perform the location procedure may be tunneled to the wireless communication device 430 via the first access network node 411, such as the BSS, and in the tunneling the positioning method may indicted. When the request to perform the location procedure is obtained by the first access network node 411 it acts as a trigger that a positioning procedure is ongoing and starts a related procedure timer.

This action may be performed by means such as a transmitting module 1310 in the positioning node 413. The transmitting module 1310 may be implemented by the processor 1380 in the positioning node 413.

receive 702 the first timing advance and the first identity of the first cell 421 and/or the second timing advance and the second identity of the second cell 422 from the first access network node 411.

The first timing advance and the first identity of the first cell 421 and/or the second timing advance and the second identity of the second cell 422 may be received using the network layer protocol connection, such as the SCCP connection.

In some embodiments, the positioning node 413 receives the first timing advance and the first identity of the first cell 421 and/or the second timing advance and the second identity of the second cell 422 from the first access network node 411 by receiving a BSSMAP-LE CONNECTION ORIENTED INFORMATION message comprising the first timing advance and the first identity of the first cell 421 and/or the second timing advance and the second identity of the second cell 422.

In some further embodiments, the BSSMAP-LE CONNECTION ORIENTED INFORMATION message comprises the BSSLAP message to be carried in a BSSLAP APDU IE, which BSSLAP message comprises the first timing advance and the first identity of the first cell 421 and/or the second timing advance and the second identity of the second cell 422.

This action may be performed by means such as a receiving module 1320 in the positioning node 413. The receiving module 1320 may be implemented by the processor 1380 in the positioning node 413.

determine 703 the position of the wireless communication device 430 based on the received first timing advance and the first identity of the first cell 421 and/or the second timing advance and the second identity of the second cell 422.

Embodiments herein may be performed in the positioning node 413. The positioning node 413 may comprise the modules mentioned above and depicted in FIG. 13.

Some further embodiments will now be described. In these embodiments the wireless communication device 430 will be exemplified with an MS, the first access network node 411 will be exemplified with an BSS, the second access network node 412 will be exemplified with a non-serving BSS and the positioning node 413 will be exemplified with an SMLC.

Embodiments herein may be used for example for the below scenarios.
(i) For scenarios when all cells involved in the Multilateration belong to the serving BSS
(ii) For scenarios when the cells involved in the Multilateration belong to the serving BSS and at least one non-serving BSS
(iii) For scenarios when the CS domain is turned off such that information transfer via the Packet Switched (PS) domain is required.

In a first embodiment, to support transfer of Multilateration related information, such as information related to the timing advance and the cell identifier, from the serving BSS to the serving SMLC node, the BSSMAP-LE CONNECTION ORIENTED INFORMATION message, as defined in 3GPP TS 49.031 v13.0.0, may comprise derived "MULTILATERATION TIMING ADVANCE" and "CELL IDENTIFER" information as information elements, see Table 1 below. The derived "MULTILATERATION TIMING ADVANCE" and "CELL IDENTIFER" may be added as Information elements to the BSSMAP-LE CONNECTION ORIENTED INFORMATION message. By transmitting the BSSMAP-LE CONNECTION ORIENTED INFORMA- TION" message prior art action 204 is avoided, and therefore the wireless communications device 430 is able to reduce its power consumption. The information referred to by the text in bold letters have been added to the message.

TABLE 1

BSSMAP-LE CONNECTION ORIENTED
INFORMATION message content

| Information element | Type/Reference | Presence | Format | Length in octets |
|---|---|---|---|---|
| Message type | Message Type | M | V | 1 |
| BSSLAP APDU | APDU | M | TLV | 3-n |
| Segmentation | Segmentation | C | TLV | 3 |
| Cell Identifier | Cell Identifier | C (Note 2) | TLV | 7 |
| Multilateration Timing Advance | Multilateration Timing Advance | C (Note 2) | TV | 3 |

NOTE 2:
This IE is included when this message is sent from the BSS to the SMLC during the Multilateration procedure.

In a second embodiment, in order to support transfer of derived timing advance information and TLLI information from a non-serving BSS to the serving BSS, which then sends the information to the serving SMLC node, the BSSMAP-LE CONNECTIONLESS INFORMATION message, e.g. as defined in 3GPP TS 49.031 v13.0.0, may comprise the derived "MULTILATERATION TIMING ADVANCE", "CELL IDENTIFER" and TLLI information, as in Table 2 below. Note that the "Network Element Identity (source)" information element is configured per the Cell Identity of the cell in which the RLC data block was received by the non-serving BSS and that the "Network Element Identity (target)" is configured per the Cell Identity of the serving BSS. That is the Cell ID may be comprised in Network Element Identity (Source).

The information referred to by the text in bold letters have been added to the message. The derived "MULTILATERATION TIMING ADVANCE", "CELL IDENTIFER" and TLLI information may be added as Information elements to the BSSMAP-LE CONNECTIONLESS INFORMATION" message.

TABLE 2

BSSMAP-LE CONNECTIONLESS INFORMATION message content

| INFORMATION ELEMENT | REFERENCE | DIRECTION | TYPE | LEN |
|---|---|---|---|---|
| Message Type | 3.2.2.1 | Both | M | 1 |
| Network Element Identity (source) | 3.2.2.69 | Both | M | 3-n |
| Network Element Identity (target) | 3.2.2.69 | Both | M | 3-n |
| APDU | 3.2.2.68 | Both | M | 3-n |
| Segmentation | 3.2,2,74 | Both | C (note 1) | 5 |
| Return Error Request | 3.2.2.72 | Both | C (note 2) | 3-n |
| Return Error Cause | 3.2.2.73 | Both | C (note 3) | 3-n |
| TLLI | 3.2.2.133 | Both | O (note 4) | 5 |
| Multilateration Timing Advance | 3.2.2.134 | Both | O (note 4) | 3 |

NOTE 1:
This IE is present if and only if the APDU comprises a message segment.
NOTE 2:
The IE is present when the source of a message requests for an error response if the message cannot be delivered to its final destination. If this IE is present, then Return Error Cause shall not be present.
NOTE 3:
The IE is present when an error is indicated that the message was not delivered to its final destination. If this IE is present, then Return Error Request shall not be present. Refer to 3GPP TS 49.031 for cause values
NOTE 4:
This IE is included when this message is sent during the Multilateration procedure.

Figure 8:
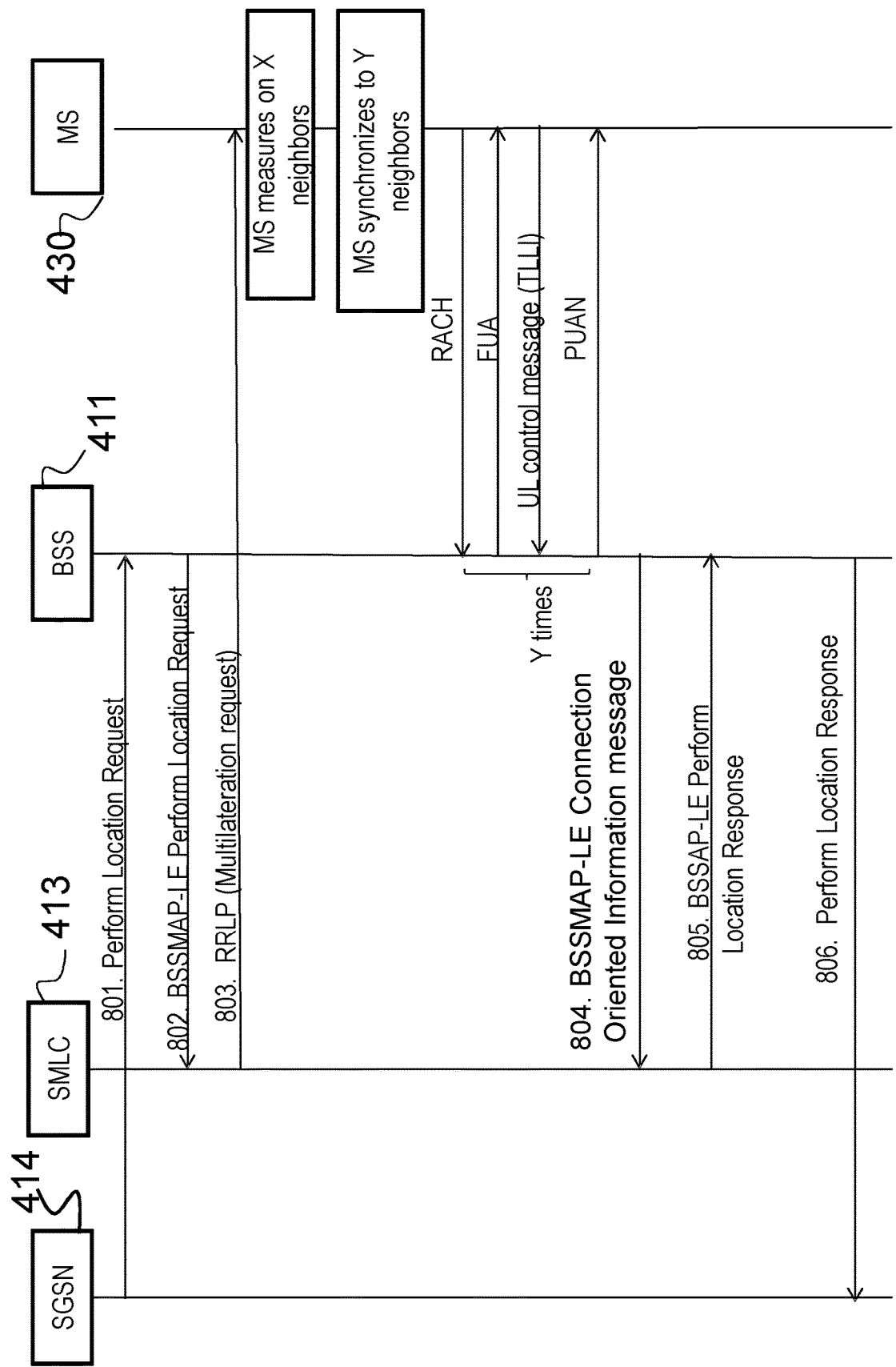
FIG. 8 illustrates an exemplary signaling flow in which the first access network node transmits a BSSMAP-LE CONNECTION ORIENTED INFORMATION message.

FIG. 8 illustrates embodiments herein wherein the first access network node 411 transmits 804 the BSSMAP-LE CONNECTION ORIENTED INFORMATION message comprising the derived "MULTILATERATION TIMING ADVANCE" and "CELL IDENTIFER". Actions 801-803 may be similar to actions 201-203 in FIG. 2, and actions 805-806 may be similar to actions 205-206 in FIG. 2. Also the actions and signaling between the BSS and the MS may be similar as described above for FIG. 2.

Figure 9:
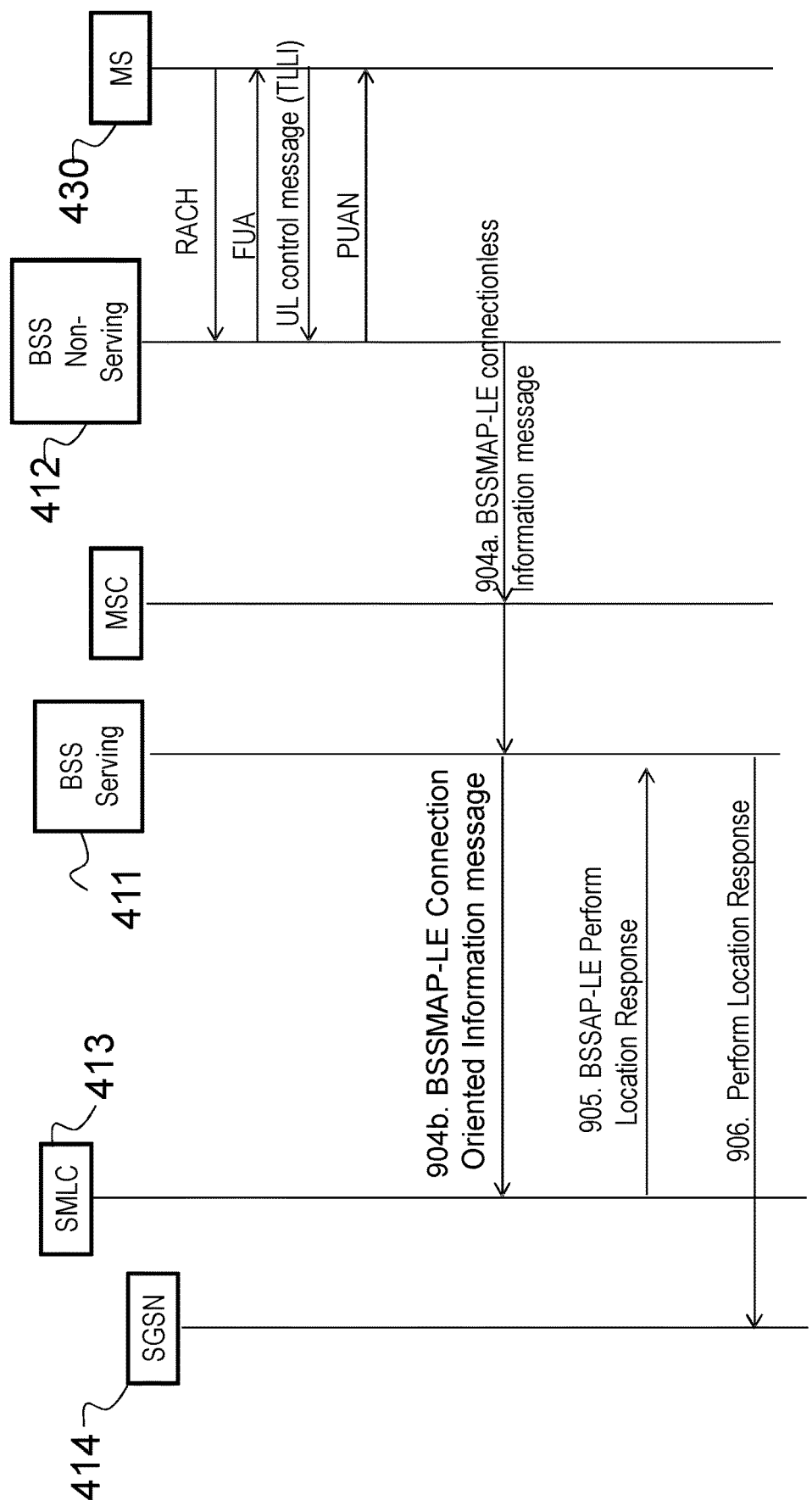
FIG. 9 illustrates an exemplary signaling flow in which the first access network node receives a BSSMAP-LE CONNECTION ORIENTED INFORMATION message.

FIG. 9 illustrates embodiments herein wherein the first access network node 411 receives 904*a* the BSSMAP-LE CONNECTIONLESS INFORMATION message from the second access network node 412. Then the first access network node 411 transmits 904*b* the BSSMAP-LE CONNECTION ORIENTED INFORMATION message comprising the derived "MULTILATERATION TIMING ADVANCE" and "CELL IDENTIFER" from the second access network node 412. Actions corresponding to actions 201-203 have been left out from FIG. 9. Actions 905-906 may be similar to actions 205-206 in FIG. 2. Also the actions and signaling between the BSS and the MS may be similar as described above for FIG. 2.

In both FIGS. 8 and 9 the first access network node 411 uses the obtained TLLI to map the TLLI and/or map the associated identity of the cell and the first timing advance value to an SCCP connection on the first interface 441, such as the Lb interface. For example, the first access network node 411 may use the obtained TLLI to determine the SCCP connection on the first interface 441

In some further embodiments, in order to support information transfer of Multilateration related information between both the serving BSS as well as non-serving BSS and the serving SM LC node, the BSSMAP-LE CONNECTION ORIENTED INFORMATION and/or the BSSMAP-LE CONNECTIONLESS INFORMATION message may comprise a BSSLAP message, e.g. as defined in 3GPP TS 48.071. This BSSLAP message may e.g. be called Multilateration Information and be formatted as indicated below in Table 3.

The Multilateration Information may be a message transmitted from the serving BSS to the serving SMLC or from the non-serving BSS to the serving BSS via the MSC. It comprises the derived timing advance value and associated Cell ID as well as TLLI when comprised in a BSSMAP-LE CONNECTIONLESS INFORMATION message.

TABLE 3

Multilateration Information message content

| Information element | Type/Reference | Presence | Format | Length |
|---|---|---|---|---|
| Message Type | Message Type IE/5.1 | M | V | 1 |
| Cell Identity | Cell Identity IE/5.4 | M | TV | 3 |
| Timing Advance | Timing Advance IE/5.2 | M | TV | 2 |
| TLLI | TLLI/5.30 (NOTE 1) | O | TV | 5 |

NOTE 1:
This IE is only included when the Multilateration message is included in a BSSMAP-LE CONNECTIONLESS INFORMATION message.

In yet some further embodiments, to support information transfer of Multilateration related information between a non-serving BSS and the serving BSS via the SGSN it is proposed to add a transport mechanism over the Gb interface. This may be achieved by introducing two associated BSSGP PDUs to be used to transfer the Multilateration related information from the non-serving BSS to the SGSN and from the SGSN to the serving BSS. The two BSSGP PDUs may e.g. be called "Multilateration Information to Core Network PDU" and "Multilateration Information to RAN PDU" and be formatted according to Table 4 and Table 5 respectively.

TABLE 4

Multilateration Information to Core Network PDU content

| Information element | Type/Reference | Presence | Format | Length |
|---|---|---|---|---|
| PDU type | PDU type/11.3.26 | M | V | 1 |
| Source Cell Identifier | Cell Identifier/11.3.9 | M | TV | 10 |
| Target Cell Identifier | Cell Identifier/11.3.9 | M | TV | 10 |
| Multilateration Timing Advance | Multilateration Timing Advance IE/11.3.X | M | TV | 3 |
| TLLI (current) | TLLI/11.3.35 | O | TV | 5 |

The source cell identifier corresponds to the cell ID associated with the derived Multilateration timing advance value and the target Cell identifier corresponds to the cell ID wherein the MS first received the RRLP Multilateration Request message. The target Cell Identifier is used by the SGSN to determine where (i.e. which BSS) to send the associated "Multilateration Information to RAN PDU".

TABLE 5

Multilateration Information to RAN PDU content

| Information element | Type/Reference | Presence | Format | Length |
|---|---|---|---|---|
| PDU type | PDU type/11.3.26 | M | V | 1 |
| Source Cell Identifier | Cell Identifier/11.3.9 | M | TV | 3 |
| Multilateration Timing Advance | Multilateration Timing Advance IE/11.3.X | M | TV | 3 |
| TLLI (current) | TLLI/11.3.35 | M | TV | 5 |

The source cell identifier corresponds to the cell ID associated with the derived Multilateration timing advance value.

In a fifth embodiment, to support information transfer of Multilateration related information, such as timing advance values and corresponding cell identities, between a non-serving BSS and the serving BSS via the SGSN a RAN Information management (RIM) procedure may be modified to comprise a Multilateration application to allow the non-serving BSS to transparently transfer Multilateration related information to the serving BSS via the SGSN. Table 6 illustrates an implementation where the Multilateration application option has been added as an application in the RIM application Identity field. A technical effect of this is that a RIM application is defined for transferring information between BSSs over the PS domain. Thus the multilateration related information, such as timing advance values and corresponding cell identities, may be provided also when there is no CS domain. The RIM protocol allows the exchange of the information between two BSSs. The PDUs conveying the RAN information between two RIM entities includes containers that are not interpreted by the core network nodes. The exchange of information is triggered by the application in a controlling BSS. In other words, in order to support transfer of Multilateration related information this RIM application is defined.

TABLE 6

RIM application Identity Coding

| Coding | Semantic |
|---|---|
| 0000 0000 | Reserved |
| 0000 0001 | Network Assisted Cell Change (NACC) |
| 0000 0010 | System Information 3 (SI3) |
| 0000 0011 | MBMS data channel |
| 0000 0100 | SON Transfer |
| 0000 0101 | UTRA System Information (UTRA SI) |
| 0000 0110 | Multilateration |
| 0000 0111-1111 1111 | Reserved |

Figure 10:
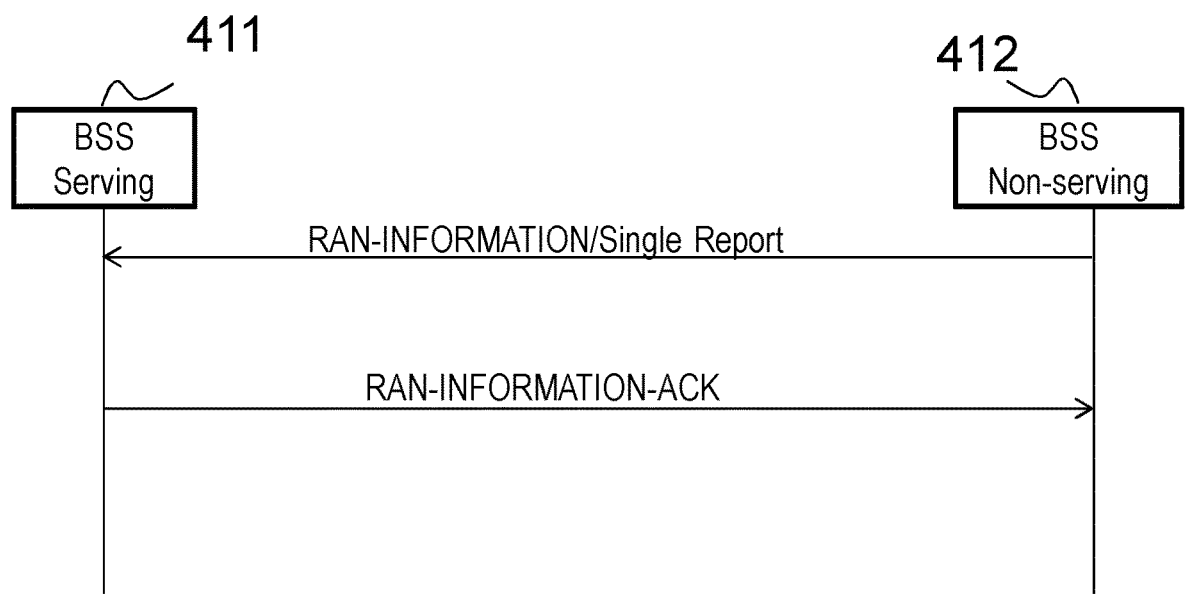
FIG. 10 illustrates an exemplary RAN Information management (RIM) procedure between a serving BSS (e.g., for a wireless communication device) and a non-serving BSS.

The RIM procedure may be modified to allow for the non-serving BSS to autonomously send a report to the serving BSS without using a RAN-INFORMATION-REQUEST PDU. This is illustrated in FIG. 10. The non-serving BSS may autonomously send a RAN-INFORMATION PDU comprising Multilateration related information to the serving BSS. The serving BSS replies with a RAN-INFORMATION-ACK.

To support this information exchange a RAN-INFORMATION Application Container for Multilateration may be used in 3GPP TS 48.018, e.g. as defined in Table 7 below. It shall be noted that, to anyone skilled in the art, there may be multiple realizations of this container all achieving the same purpose, i.e., to transfer the estimated timing advance, TLLI and the cell ID.

TABLE 7

| RAN-INFORMATION Application Container for Multilateration | | | | | | | |
|---|---|---|---|---|---|---|---|
| 8 | 7 | 6 | 5 | 4 | 3 | 2 | 1 |
| Octet 1 | | | IEI | | | | |
| Octet 2, 2a | | | Length Indicator | | | | |
| Octet 3-10 | | | Reporting Cell Identifier | | | | |
| Octet 11-12 | | | Multilateration Timing Advance/11.3.xx | | | | |
| Octet 12-15 | | | TLLI/11.3.35 | | | | |

Reporting Cell Identifier: This field may be encoded as the value part of the Cell Identifier IE defined in sub-clause 11.3.9 of 3GPP TS 48.018, not including Information Element Identifier (IEI) and Length Indicator.

Multilateration Timing Advance: Comprises the estimated Timing Advance, see sub-clause 11.3.35xx of 3GPP TS 48.018.

TLLI: Comprises the TLLI, see sub-clause 11.3.35 of 3GPP TS 48.018.

Alternatively, the serving BSS may use the RAN Information Request/Multiple Report Procedure to request information from the non-serving BSS to send Multilateration related information. In that case the Destination ID in the RAN-INFORMATION-REQUEST/Multiple Report PDU may be the cell ID and the serving BSS may therefore request information from more cells than what will be used in the Multilateration procedure. For the proposed Network assisted method the procedure is under network control implying that it will be possible for the serving BSS to only send the RAN-INFORMATION-REQUEST/Multiple Report PDU to the BSSs managing the involved cells. On the other hand, for an MS autonomous procedure the serving BSS may need to guess the cells that the MS will use and thus send a RAN-INFORMATION-REQUEST/Multiple Report PDU to these cells in advance.

To support this information exchange, in addition to the RAN-INFORMATION Application Container for Multilateration in Table 7, a RAN-INFORMATION-REQUEST Application Container for Multilateration may be used in 3GPP TS 48.018, see Table 8 below.

TABLE 8

| RAN-INFORMATION-REQUEST Application Container for Multilateration | | | | | | | |
|---|---|---|---|---|---|---|---|
| 8 | 7 | 6 | 5 | 4 | 3 | 2 | 1 |
| Octet 1 | | | | IEI | | | |
| Octet 2, 2a | | | | Length Indicator | | | |
| Octet 3-10 | | | | Reporting Cell Identifier | | | |
| Octet 11-14 | | | | TLLI/11.3.35 | | | |

Reporting Cell Identifier: This field may be encoded as the value part of the Cell Identifier IE defined in sub-clause 11.3.9 of 3GPP TS 48.018, not including IEI and Length Indicator.

TLLI: Comprises the TLL, see sub-clause 11.3.35 of 3GPP TS 48.018.

Note that the Reporting Cell Identifier is set to the same value as the Destination Cell Identifier IE of the RAN-INFORMATION-REQUEST PDU.

An advantage with embodiments herein is that they improve the positioning, such as the multilateration, of the wireless communication device 430 in that they improve transfer of information required for the positioning, e.g. TLLI, derived Timing Advance value and Cell ID, to the serving SM LC node. For example, due to the improved transfer of information the power consumption of the wireless communication device 430 is reduced. Further, the method may be applied for the following scenarios For scenarios when all cells involved in the Multilateration belong to the serving BSS (ii) For scenarios when the cells involved in the Multilateration belong to the serving BSS and at least one non-serving BSS (iii) For scenarios when the CS domain is turned off such that information transfer via the Packet Switched (PS) domain is required.

Figure 11:
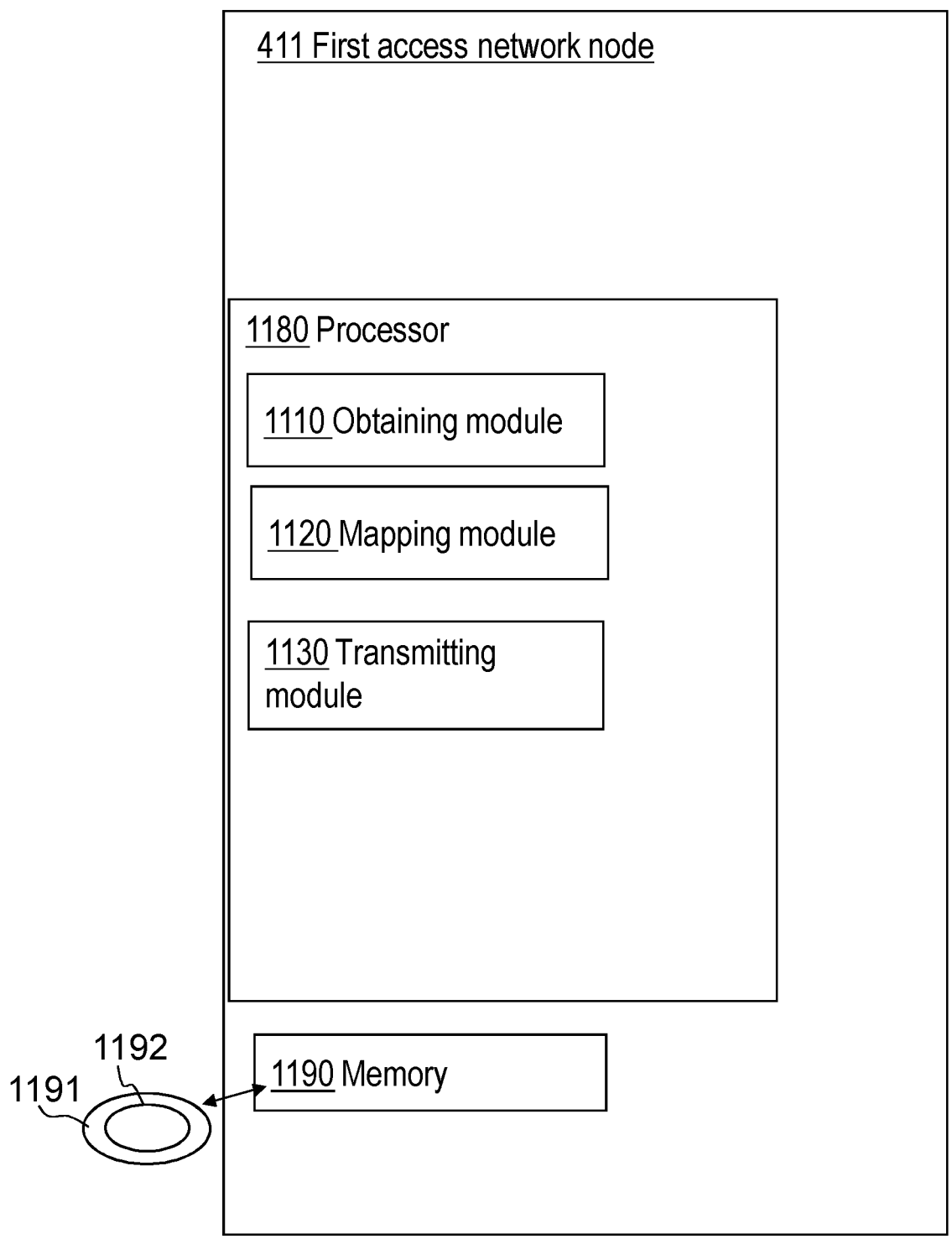
FIG. 11 illustrates an exemplary first access network node according to various embodiments described herein.

FIG. 11 is a block diagram depicting the first access network node 411 for performing a method for positioning of a wireless communication device. The first access network node 411 may comprise a processor 1180 configured to perform the method as described herein, as performed by the first access network node 411. Dashed lines of a box in FIG. 11 indicate that this box is not mandatory and relates to some embodiments only.

The first access network node 411 is configured to obtain a first information relating to multilateration of the wireless communication device 430. The first information relating to multilateration comprises a first timing advance value, or a first indication of the first timing advance value, associated with the first access network node 411 and the wireless communication device 430, a Temporary Logical Link Identifier (TLLI) corresponding to the wireless communication device 430 and a first identity of a first cell 421. The first cell 421 is the cell in which the first timing advance was obtained. The first access network node 411 is further configured to obtain a second information relating to multilateration of the wireless communication device 430. The second information relating to multilateration comprises a second timing advance value, or a second indication of the second timing advance value, associated with the second access network node 411 and the wireless communication device 430, a Temporary Logical Link Identifier (TLLI) corresponding to the wireless communication device 430 and a second identity of a second cell 422. The second cell 422 is the cell in which the second timing advance was obtained.

In some embodiments, the first access network node 411 may comprise an obtaining module 1110 and/or the processor 1180 being configured to obtain the first and the second information relating to multilateration of the wireless communication device 430.

The first access network node 411 is further configured to map the first TLLI and the associated first identity of the first cell 421 and the first timing advance value and the second TLLI and the associated second identity of the second cell 422 and the second timing advance value, to a network layer protocol connection on a first interface 441.

In some embodiments, the first access network node 411 may comprise a mapping module 1120 and/or the processor 1180 being configured to map the first TLLI and the associated first identity of the first cell 421 and the first timing advance value to a network layer protocol connection on a first interface 441.

The first access network node 411 is further configured to transmit, to a positioning node 413, the first timing advance and the first identity of the first cell 421 and the second timing advance and the second identity of the second cell 422.

In some embodiments the first access network node 411 may comprise a transmitting module 1130 and/or the processor 1180 being configured to transmit, to a positioning node 413, the first timing advance and the first identity of the first cell 421. The wireless communication device 615 may further be configured to obtain, from the core network node 414, a request to perform a location procedure. In some embodiments the first access network node 411 may comprise the processor 1180, the obtaining module 1110 further being configured to obtain, from the core network node 414, the request to perform a location procedure.

The first access network node 411 may further be configured to obtain the second information relating to multilateration from a second access network node 412.

In some embodiments the first access network node 411 may comprise the obtaining module 1110 and/or the processor 1180 further being configured to obtain the second information relating to multilateration from the second access network node 412.

The first access network node 411 may further be configured to determine the network layer protocol connection on the first interface to be used for transmitting the timing advance and the identity of the cell(s).

In some embodiments the first access network node 411 may comprise the processor 1180 or a determining module 1140 further being configured to determine the network layer protocol connection on the first interface to be used for transmitting the timing advance and the identity of the cell(s).

FIG. 12 is a block diagram depicting a second access network node 412, for performing a method for positioning of a wireless communication device 430. The second access network node 412 is not serving the wireless communication device 430. Dashed lines of a box in FIG. 12 indicate that this box is not mandatory and relates to some embodiments only.

The second access network node 412 is configured to obtain a second information relating to multilateration of the wireless communication device 430. The second information relating to multilateration comprises a second timing advance value, or a second indication of the second timing advance value, associated with the second access network node 412 and the wireless communication device 430, a second Temporary Logical Link Identifier (TLLI) corresponding to the wireless communication device 430 and a second identity of a first cell 421. The first cell 421 is a cell in which the first timing advance was obtained.

In some embodiments the second access network node 412 may comprise a processor 1280 or an obtaining module 1210 being configured to obtain the second information relating to multilateration of the wireless communication device 430.

The second access network node 412 is further configured to transmit the second information to a first access network node 411.

In some embodiments the second access network node 412 may comprise a transmitting module 1220 or the processor 1280 being configured to transmit the second information to a first access network node 411.

FIG. 13 is a block diagram depicting a positioning node 413, for performing a method for positioning of a wireless communication device 430. Dashed lines of a box in FIG. 13 indicate that this box is not mandatory and relates to some embodiments only.

The positioning node 413 is configured to receive, from a first access network node 411, a first timing advance and a first identity of a first cell 421 and a second timing advance and a second identity of a second cell 422.

In some embodiments the positioning node 413 may comprise a receiving module 1320 being configured to receive, from the first access network node 411, the first timing advance and the first identity of a first cell 421 and a second timing advance and a second identity of a second cell 422.

The positioning node 413 is further configured to determine the position of the wireless communication device based on the received first timing advance and the first identity of the first cell 421 and the received second timing advance and the second identity of the second cell 422.

In some embodiments the positioning node 413 may comprise a determining module 1330 or the processor 1380 being configured to determine the position of the wireless communication device based on the received first timing advance and the first identity of the first cell 421 and the received second timing advance and the second identity of the second cell 422.

The positioning node 413 may further be configured to transmit, to the first access network node 411, a request to perform a location procedure.

In some embodiments the positioning node 413 may comprise a transmitting module 1310 or the processor 1380 further being configured to transmit, to the first access network node 411, a request to perform a location procedure.

The embodiments herein may be implemented through one or more processors, such as the processor 1180 in the first access network node 411 depicted in FIG. 11, and the processor 1280 in the second access network node 412 depicted in FIG. 12, and the processor 1380 in the positioning node 413 depicted in FIG. 13 together with computer program code for performing the functions and actions of the embodiments herein.

The program code mentioned above may also be provided as a computer program product 1191, 1291, 1391 for instance in the form of a data carrier carrying computer program code 1192, 1292, 1392 for performing the embodiments herein when being loaded into the first access network node 411, the second access network node 412 and the positioning node 413. One such carrier may be in the form of a CD ROM disc. It is however feasible with other data carriers such as a memory stick. The computer program code may furthermore be provided as pure program code on a server and downloaded to the first access network node 411, the second access network node 412 and the positioning node 413.

Thus, the methods according to the embodiments described herein for the first access network node 411, the second access network node 412 and the positioning node 413 may be implemented by means of a computer program product, comprising instructions, i.e., software code portions, which, when executed on at least one processor, cause the at least one processor to carry out the actions described herein, as performed by the first access network node 411, the second access network node 412 and the positioning node 413. The computer program product may be stored on a computer-readable storage medium. The computer-readable storage medium, having stored there on the computer program, may comprise the instructions which, when executed on at least one processor, cause the at least one processor to carry out the actions described herein, as performed by the first access network node 411, the second access network node 412 and the positioning node 413. In some embodiments, the computer-readable storage medium may be a non-transitory computer-readable storage medium.

The first access network node 411, the second access network node 412 and the positioning node 413 may further each comprise a memory 1190, 1290, 1390 comprising one or more memory units. The memory 1190, 1290, 1390 is arranged to be used to store obtained information such as timing advance values, TLLIs, cell ID etc. and applications etc. to perform the methods herein when being executed in the first access network node 411, the second access network node 412 and the positioning node 413.

Those skilled in the art will also appreciate that the different modules described above may refer to a combination of analog and digital circuits, and/or one or more processors configured with software and/or firmware, e.g. stored in the memory, that when executed by the one or more processors, such as the processors in the first access network node 411, the second access network node 412 and the positioning node 413 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope.

| Abbreviation | Explanation |
|---|---|
| BTS | Base Transceiver Station |
| EC-GSM-IoT | Extended Coverage GSM-IoT |
| GSM | Global System for Mobile telephony |
| IoT | Internet of Things |
| LTE | Long Term Evolution |
| MS | Mobile Station |
| MTC | Machine Type Communication |
| NB-IoT | Narrow Band IoT |
| TA | Timing Advance |

The invention claimed is:

1. A method, performed by a first access network node, for positioning of a wireless communication device served by a first cell managed by the first access network node, the method comprising:
   obtaining a first and a second information relating to multilateration of the wireless communication device, wherein:
      the first information comprises:
         a first timing advance value, or a first indication of the first timing advance value, associated with the first access network node and the wireless communication device,
         a Temporary Logical Link Identifier (TLLI) corresponding to the wireless communication device, and
         a first identity of the first cell, in which the first timing advance was obtained;
      the second information comprises:
         a second timing advance value, or a second indication of the second timing advance value, associated with a second access network node and the wireless communication device,
         the TLLI, and
         a second identity of a second cell managed by the second access network node, in which the second timing advance was obtained;
      the first timing advance value is obtained by the first access network node determining the first timing advance value and wherein the first access network node obtains the second information from the second access network node,
   mapping the following information to a network layer protocol connection on a first interface based on the TLLI:
      the first identity of the first cell and the first timing advance value, and
      the second identity of the second cell and the second timing advance value; and
   transmitting, to a positioning node, the first timing advance value and the first identity of the first cell, and the second timing advance value and the second identity of the second cell.

2. The method according to claim 1, further comprising obtaining, from a core network node, a request to perform a location procedure.

3. The method according to claim 1, wherein the mapping comprises determining the network layer protocol connection on the first interface to be used for transmitting the timing advance and the identity of the cell(s).

4. A method, performed by a second access network node, for positioning of a wireless communication device served by a first cell managed by a first access network node, the method comprising:
   obtaining a second information relating to multilateration of the wireless communication device, wherein the second information comprises:
      a second timing advance value, or a second indication of the second timing advance value, associated with the second access network node and the wireless communication device,
      a Temporary Logical Link Identifier (TLLI) corresponding to the wireless communication device, and
      a second identity of a second cell, in which the second timing advance was obtained,
      wherein the second timing advance value is obtained by determining the second timing advance value; and
   transmitting the second information to the first access network node that manages the first cell serving the wireless communication device.

5. A method, performed by a positioning node, for positioning of a wireless communication device, the method comprising:
   receiving, from a first access network node that manages a first cell serving the wireless communication device, a first timing advance value and a first identity of the first cell and a second timing advance value and a second identity of a second cell managed by a second access network node; and
   determining the position of the wireless communication device based on the received first timing advance value and the first identity of the first cell, and based on the received second timing advance value and the second identity of the second cell.

6. The method according to claim 5, further comprising transmitting, to the first access network node, a request to perform a location procedure.

7. The method according to claim 5, further comprising:
   receiving, from the first access network node, a first Temporary Logical Link Identifier (TLLI) corresponding to the wireless communication device.

8. The method according to claim 7, wherein the first timing advance value, the first identity of the first cell and the first TLLI are received in a first message, and wherein the second timing advance value, the second identity of the second cell, and a second TLLI are received in a second message.

9. A first access network node configured to position a wireless communication device served by a first cell managed by the first access network node, the first access network node comprising:
   a processor; and
   a memory storing instructions executable by said processor, whereby said first access network node is configured to:
      obtain a first and a second information relating to multilateration of the wireless communication device, wherein:
         the first information comprises:
            a first timing advance value, or a first indication of the first timing advance value, associated with the first access network node and the wireless communication device,
            a Temporary Logical Link Identifier (TLLI) corresponding to the wireless communication device, and
            a first identity of the first cell, in which the first timing advance was obtained;
         the second information comprises:
            a second timing advance value, or a second indication of the second timing advance value, associated with a second access network node and the wireless communication device,
the TLLI, and
a second identity of a second cell managed by the second access network node, in which the second timing advance was obtained;
the first timing advance value is obtained by determining the first timing advance value and wherein the first access network node obtains the second information from the second access network node;
map the following information to a network layer protocol connection on a first interface based on the TLLI:
the first identity of the first cell and the first timing advance value, and
the second identity of the second cell and the second timing advance value; and
transmit, to a positioning node, the first timing advance value and the first identity of the first cell, and the second timing advance value and the second identity of a second cell.

10. The first access network node according to claim 9, wherein execution of the instructions further configures the first access network node to obtain, from a core network node, a request to perform a location procedure.

11. The first access network node according to claim 9, wherein execution of the instructions further configures the first access network node to determine the network layer protocol connection on the first interface to be used for transmitting the timing advance and the identity of the cell(s).

12. A second access network node configured to position a wireless communication device served by a first cell managed by a first access network node, wherein the second access network node comprises:
a processor; and
a memory storing instructions executable by said processor, whereby the second access network node is configured to:
obtain a second information relating to multilateration of the wireless communication device, wherein the second information comprises:
a second timing advance value, or a second indication of the second timing advance value, associated with the second access network node and the wireless communication device,
a Temporary Logical Link Identifier (TLLI) corresponding to the wireless communication device, and
a second identity of a second cell, in which the second timing advance was obtained,
wherein the second timing advance value is obtained by determining the second timing advance value; and
transmitting the second information to the first access network node that manages the first cell serving the wireless communication device.

13. A positioning node configured to position a wireless communication device, the positioning node comprising:
a processor; and
a memory storing instructions executable by said processor, whereby the positioning node is configured to:
receive, from a first access network node that manages a first cell serving the wireless communication device, a first timing advance value and a first identity of the first cell and a second timing advance value and a second identity of a second cell managed by a second access network node; and
determine the position of the wireless communication device based on the received first timing advance value and the first identity of the first cell, and based on the received second timing advance and the second identity of the second cell.

14. The positioning node according to claim 13, wherein execution of the instructions further configures the positioning node to transmit, to the first access network node, a request to perform a location procedure.

15. The positioning node according to claim 13, wherein the positioning node is further configured to:
receive, from the first access network node, a first Temporary Logical Link Identifier (TLLI) corresponding to the wireless communication device.

16. The positioning according to claim 15, wherein the first timing advance value, the first identity of the first cell and the first TLLI are received in a first message, and wherein the second timing advance value, the second identity of the second cell, and a second TLLI are received in a second message.

* * * * *